US007733810B2

(12) United States Patent
Denecheau et al.

(10) Patent No.: US 7,733,810 B2
(45) Date of Patent: Jun. 8, 2010

(54) SYSTEM AND METHOD FOR COMMUNICATING ON A VIRTUAL RING IN AN INTERNET PROTOCOL NETWORK

(75) Inventors: Lionel Denecheau, Verrieres le Buisson (FR); Denis Esteve, Vence (FR); Patrick Sicsic, La Colle sur Loup (FR)

(73) Assignee: International Business Machines Corporation, Armonk, NY (US)

( * ) Notice: Subject to any disclaimer, the term of this patent is extended or adjusted under 35 U.S.C. 154(b) by 627 days.

(21) Appl. No.: 10/596,641

(22) PCT Filed: Nov. 30, 2004

(86) PCT No.: PCT/EP2004/053185

§ 371 (c)(1),
(2), (4) Date: Mar. 23, 2007

(87) PCT Pub. No.: WO2005/060156

PCT Pub. Date: Jun. 30, 2005

(65) Prior Publication Data

US 2007/0268913 A1      Nov. 22, 2007

(30) Foreign Application Priority Data

Dec. 19, 2003   (EP)   ................................ 03368121

(51) Int. Cl.
*H04L 12/28*   (2006.01)
(52) U.S. Cl. .................. 370/258; 370/222; 370/395.53; 370/452; 709/221; 709/231; 709/239; 398/3; 398/59

(58) Field of Classification Search ................. 370/409, 370/222, 258, 395.53, 424, 450, 452, 474, 370/404–405, 460, 254, 231; 398/3, 59, 398/167; 709/221, 222, 231, 239, 244, 242, 709/248, 251, 236
See application file for complete search history.

(56) References Cited

U.S. PATENT DOCUMENTS 4,538,147 A * 8/1985 Grow .......................... 370/452

(Continued)

FOREIGN PATENT DOCUMENTS

EP           561381 A2 *  9/1993

(Continued)

*Primary Examiner*—Aung S Moe
*Assistant Examiner*—Benjamin Elliott
(74) *Attorney, Agent, or Firm*—Lieberman & Brandsdorfer, LLC

(57) ABSTRACT

A node within a network comprising a transport layer protocol for multicasting datagrams on a virtual ring. Each node on the virtual ring is logically connected to two neighbour nodes through virtual connections. A virtual ring datagram is sent to a downstream neighbour node on the virtual ring and a token is received. The virtual ring is identified and the token is forwarded to the downstream neighbour node. If the received datagram is a virtual ring datagram, the virtual ring is identified and the node originator of the received virtual ring datagram is checked. If the received virtual ring datagram has not been locally originated, data in the virtual ring datagram is processed and the virtual ring datagram is forwarded to the downstream neighbour node on the virtual ring. If the received virtual ring datagram has been locally originated, the virtual ring datagram is removed from the virtual ring.

16 Claims, 19 Drawing Sheets

Token on Virtual Ring

U.S. PATENT DOCUMENTS

| | | | | |
|---|---|---|---|---|
| 4,590,468 | A * | 5/1986 | Stieglitz | 370/450 |
| 4,713,807 | A * | 12/1987 | Caves et al. | 370/460 |
| 4,731,784 | A * | 3/1988 | Keller et al. | 398/99 |
| 4,736,368 | A * | 4/1988 | Szczepanek | 370/455 |
| 4,766,530 | A * | 8/1988 | Roslund | 709/225 |
| 4,780,871 | A * | 10/1988 | Arakawa | 370/450 |
| 4,860,284 | A * | 8/1989 | Brown et al. | 370/452 |
| 5,023,871 | A * | 6/1991 | Nakayashiki et al. | 370/455 |
| 5,053,946 | A * | 10/1991 | Jain | 709/251 |
| 5,107,490 | A * | 4/1992 | Wilson et al. | 370/404 |
| 5,243,596 | A * | 9/1993 | Port et al. | 370/231 |
| 5,253,252 | A * | 10/1993 | Tobol | 370/452 |
| 5,289,390 | A * | 2/1994 | Unverrich | 345/1.1 |
| 5,383,186 | A * | 1/1995 | Shin et al. | 370/453 |
| 5,490,145 | A * | 2/1996 | Tanabe et al. | 370/452 |
| 5,553,073 | A * | 9/1996 | Barraclough et al. | 370/455 |
| 5,604,742 | A * | 2/1997 | Colmant et al. | 370/396 |
| 5,752,003 | A * | 5/1998 | Hart | 709/223 |
| 5,802,056 | A * | 9/1998 | Ferguson et al. | 370/403 |
| 5,802,060 | A * | 9/1998 | Fischbach et al. | 370/444 |
| 5,886,992 | A * | 3/1999 | Raatikainen et al. | 370/410 |
| 6,005,869 | A * | 12/1999 | Sakai et al. | 370/452 |
| 6,154,462 | A * | 11/2000 | Coden | 370/403 |
| 6,366,556 | B1 * | 4/2002 | Ballintine et al. | 370/216 |
| 6,393,489 | B1 * | 5/2002 | Sambamurthy et al. | 709/250 |
| 6,460,101 | B1 * | 10/2002 | Arimilli et al. | 710/107 |
| 6,563,833 | B1 * | 5/2003 | Wool et al. | 370/404 |
| 6,639,893 | B1 * | 10/2003 | Chikenji et al. | 370/217 |
| 6,880,017 | B1 * | 4/2005 | Marce et al. | 709/232 |
| 7,106,695 | B2 * | 9/2006 | Denecheau et al. | 370/230 |
| 7,181,547 | B1 * | 2/2007 | Millet | 709/251 |
| 7,269,731 | B2 * | 9/2007 | Oakeson et al. | 713/172 |
| 7,287,170 | B2 * | 10/2007 | Sadowski | 713/300 |
| 7,366,109 | B2 * | 4/2008 | Ashwood-Smith | 370/254 |
| 2002/0112065 | A1 * | 8/2002 | Denecheau et al. | 709/230 |
| 2002/0181505 | A1 * | 12/2002 | Denecheau et al. | 370/468 |
| 2003/0035436 | A1 * | 2/2003 | Denecheau et al. | 370/452 |
| 2003/0041164 | A1 * | 2/2003 | Denecheau et al. | 709/232 |
| 2003/0154285 | A1 * | 8/2003 | Berglund et al. | 709/227 |
| 2007/0268913 | A1 * | 11/2007 | Denecheau et al. | 370/397 |

FOREIGN PATENT DOCUMENTS

WO     WO 9909713 A1 * 2/1999

* cited by examiner

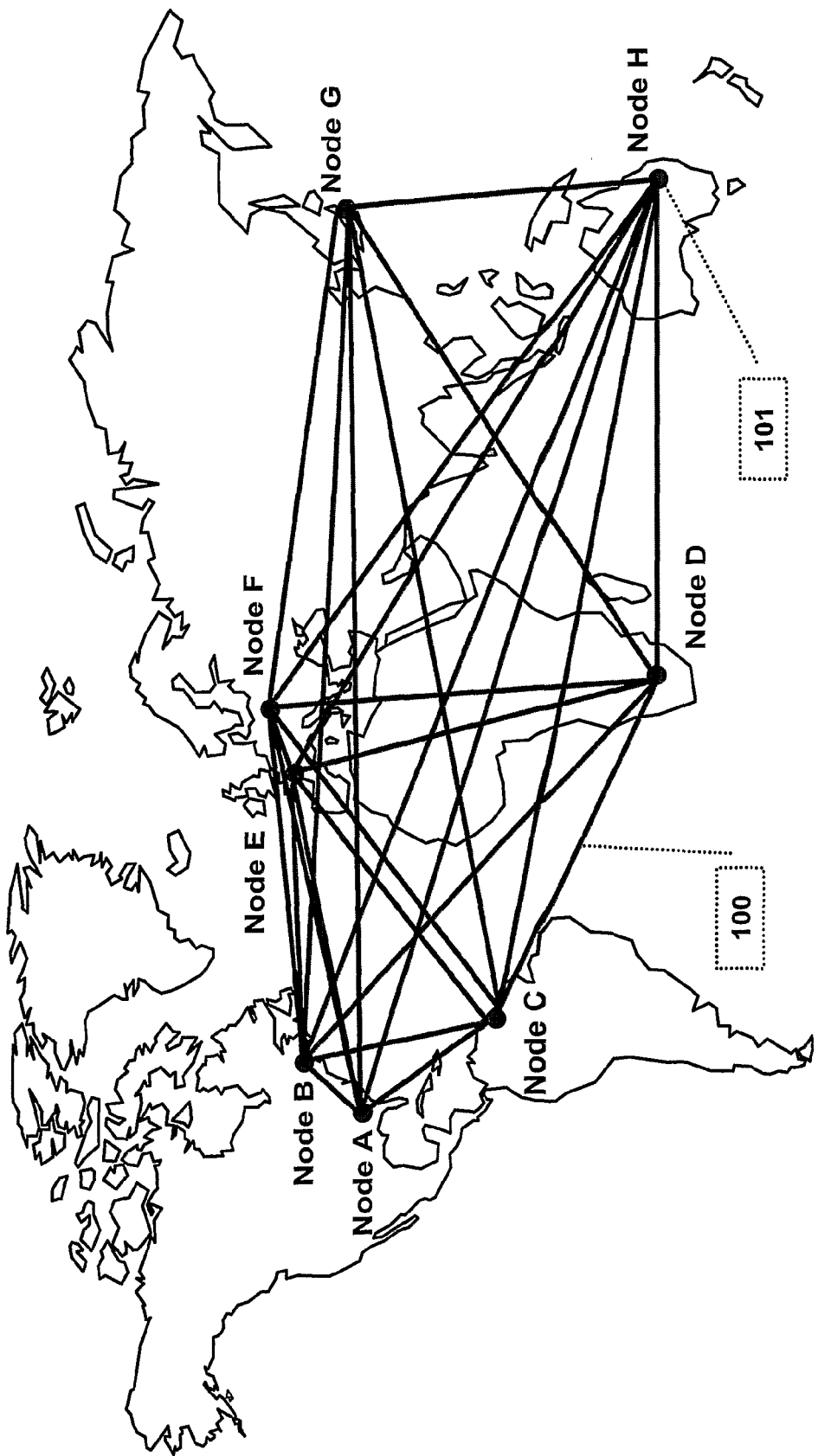
Figure 1 : Full mesh network

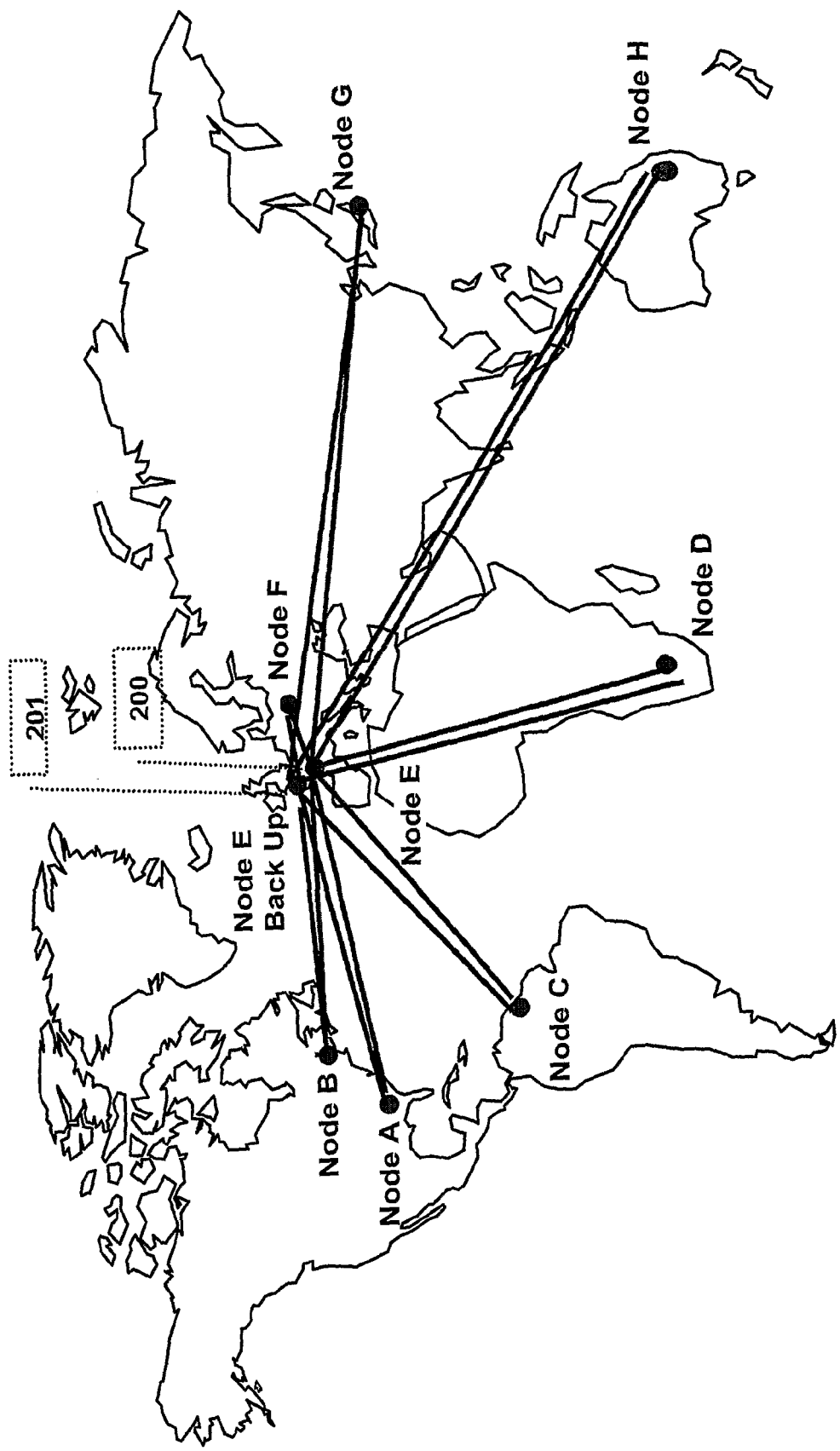
Figure 2: Star network

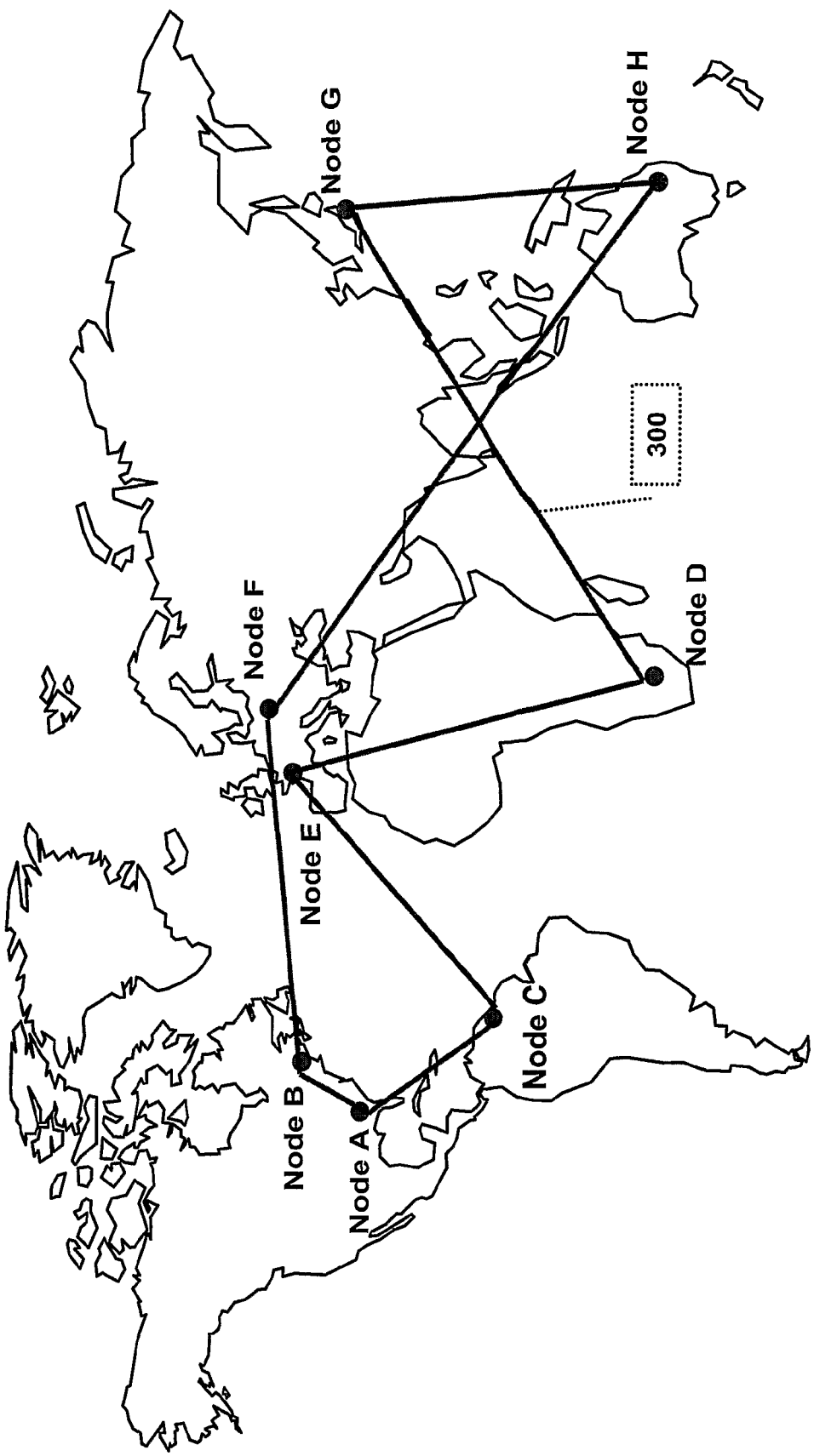
Figure 3: Virtual Ring Network

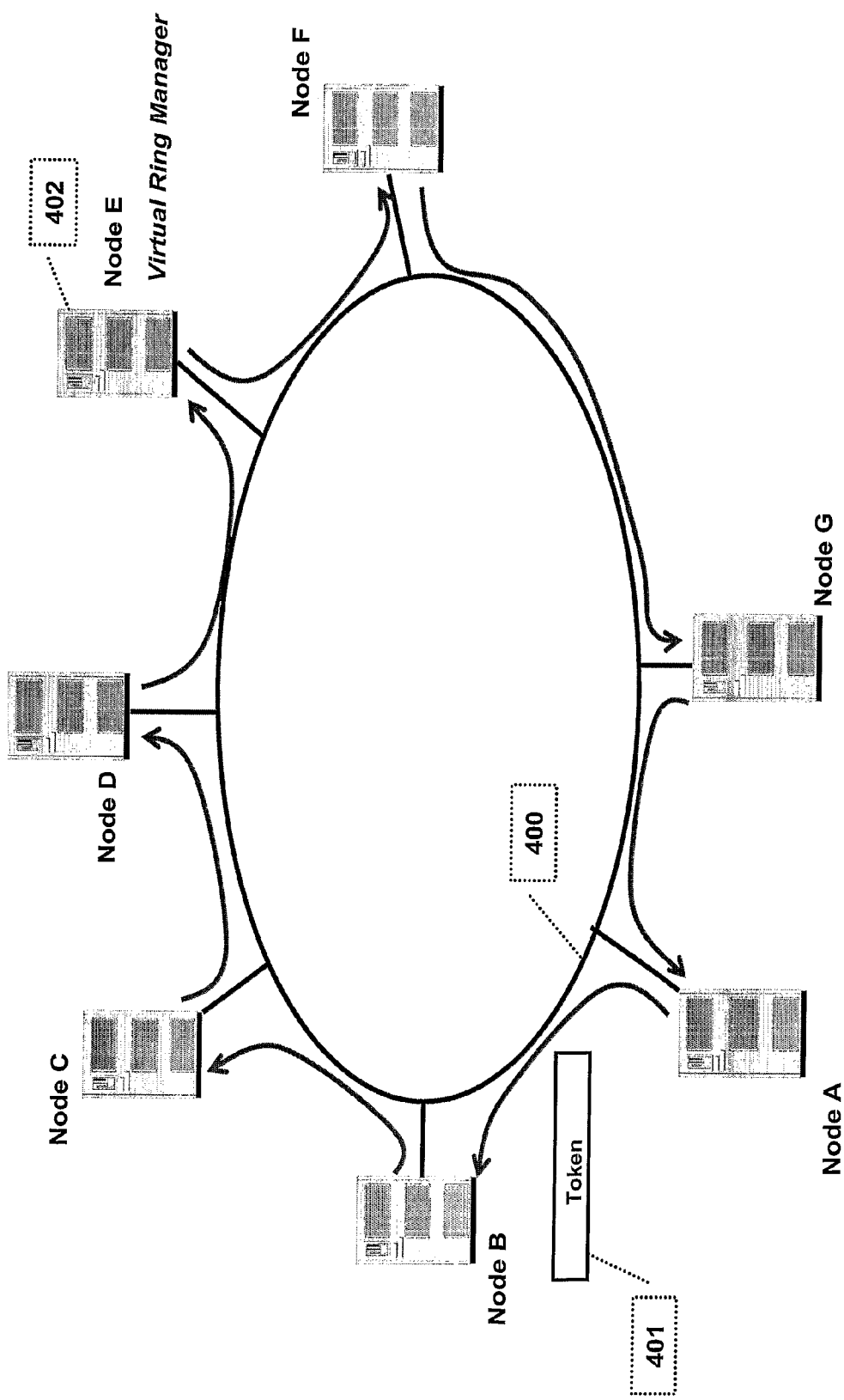
Figure 4: Token on Virtual Ring

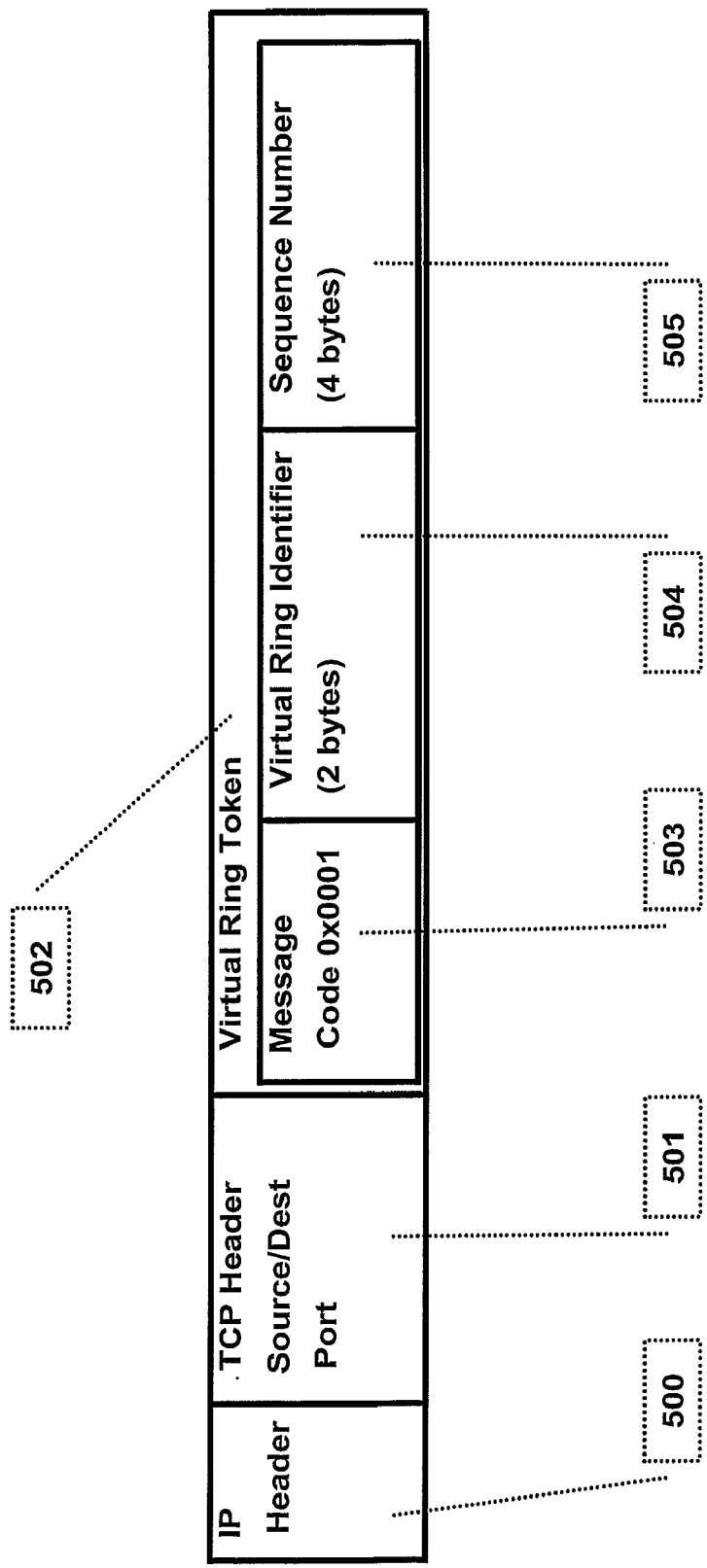
Figure 5: Token description

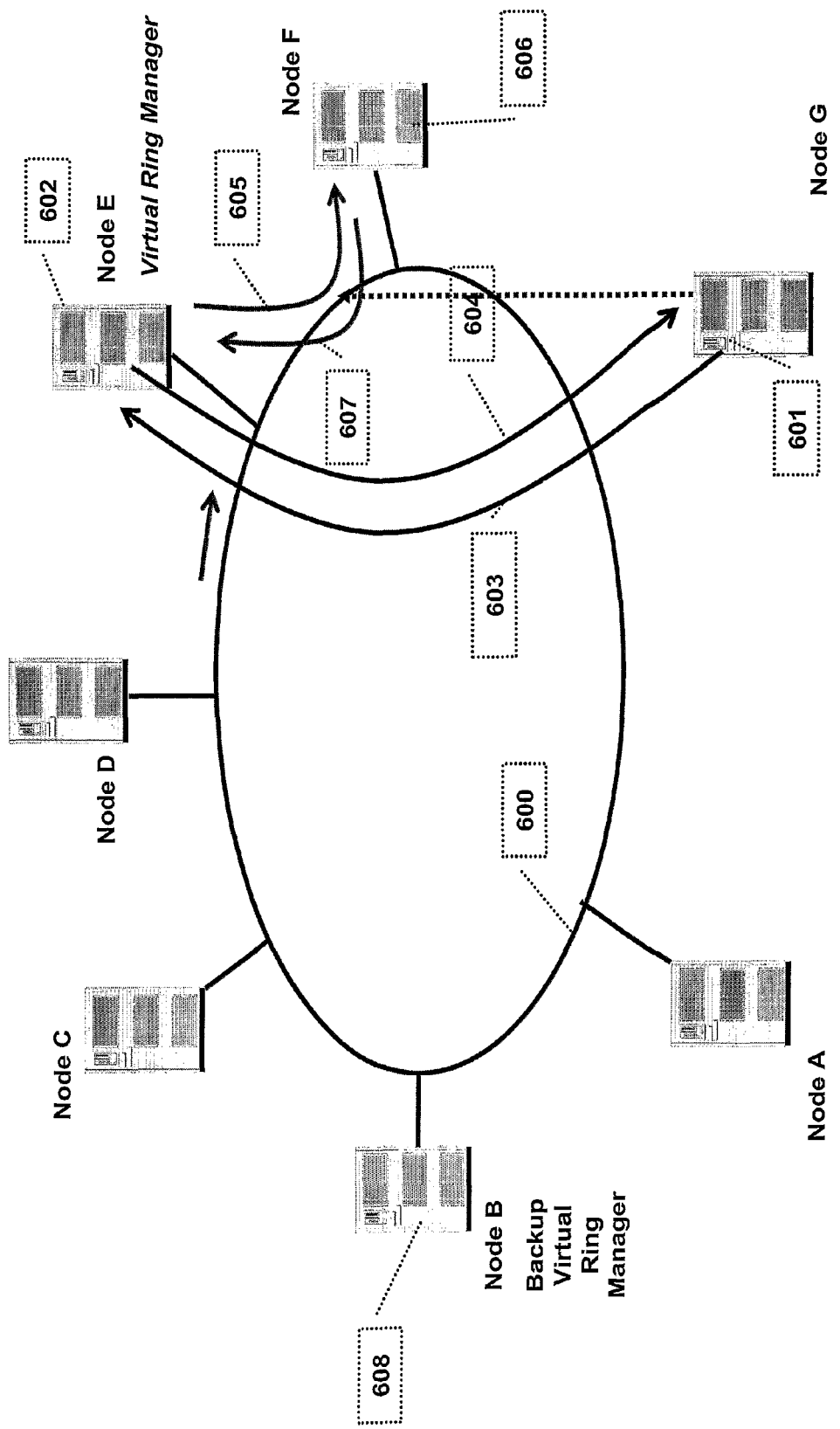
Figure 6: Node insertion on the Virtual Ring

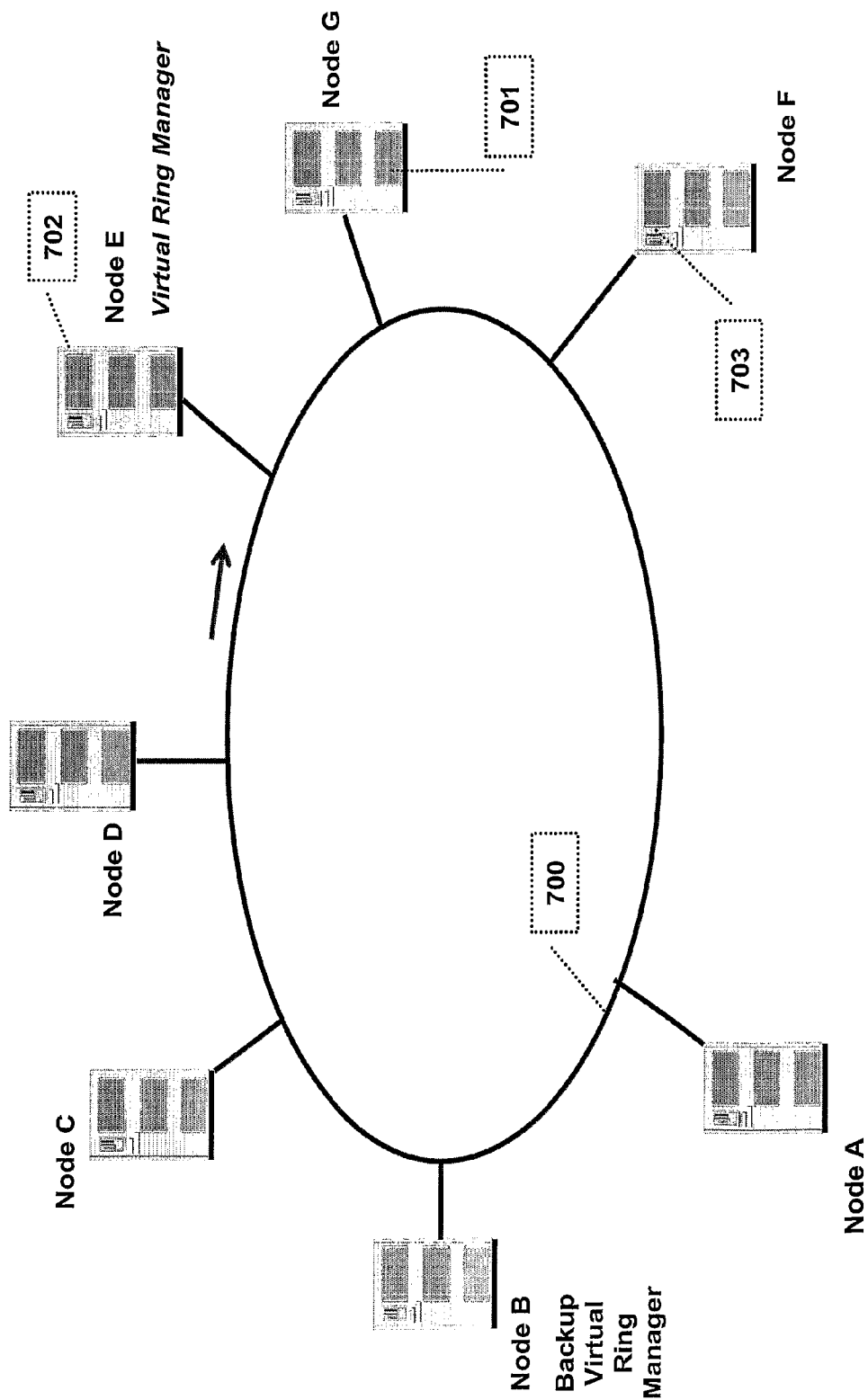
Figure 7: Node insertion on the Virtual Ring - Result

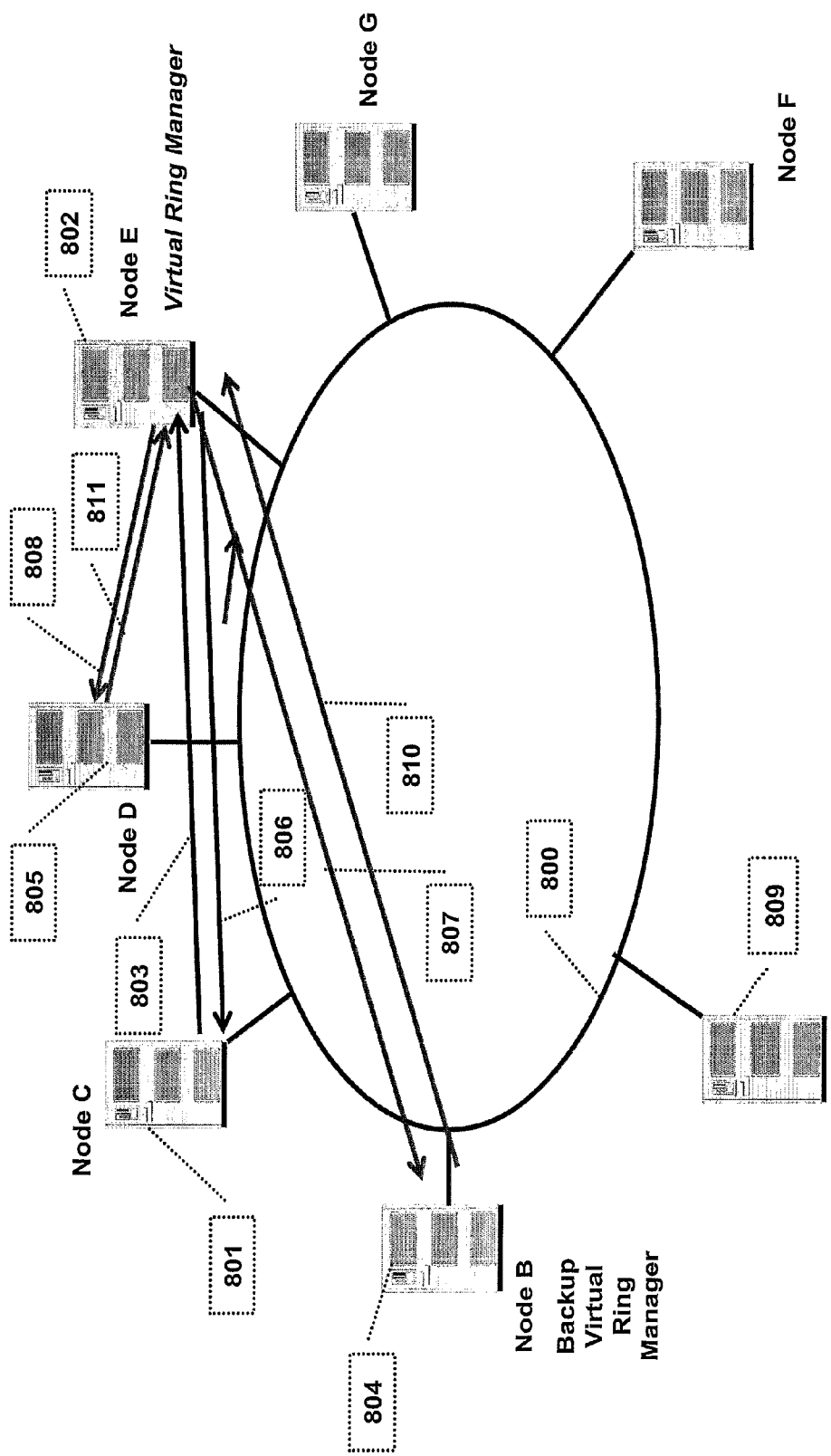
Figure 8: Node solicited removal from the Virtual Ring

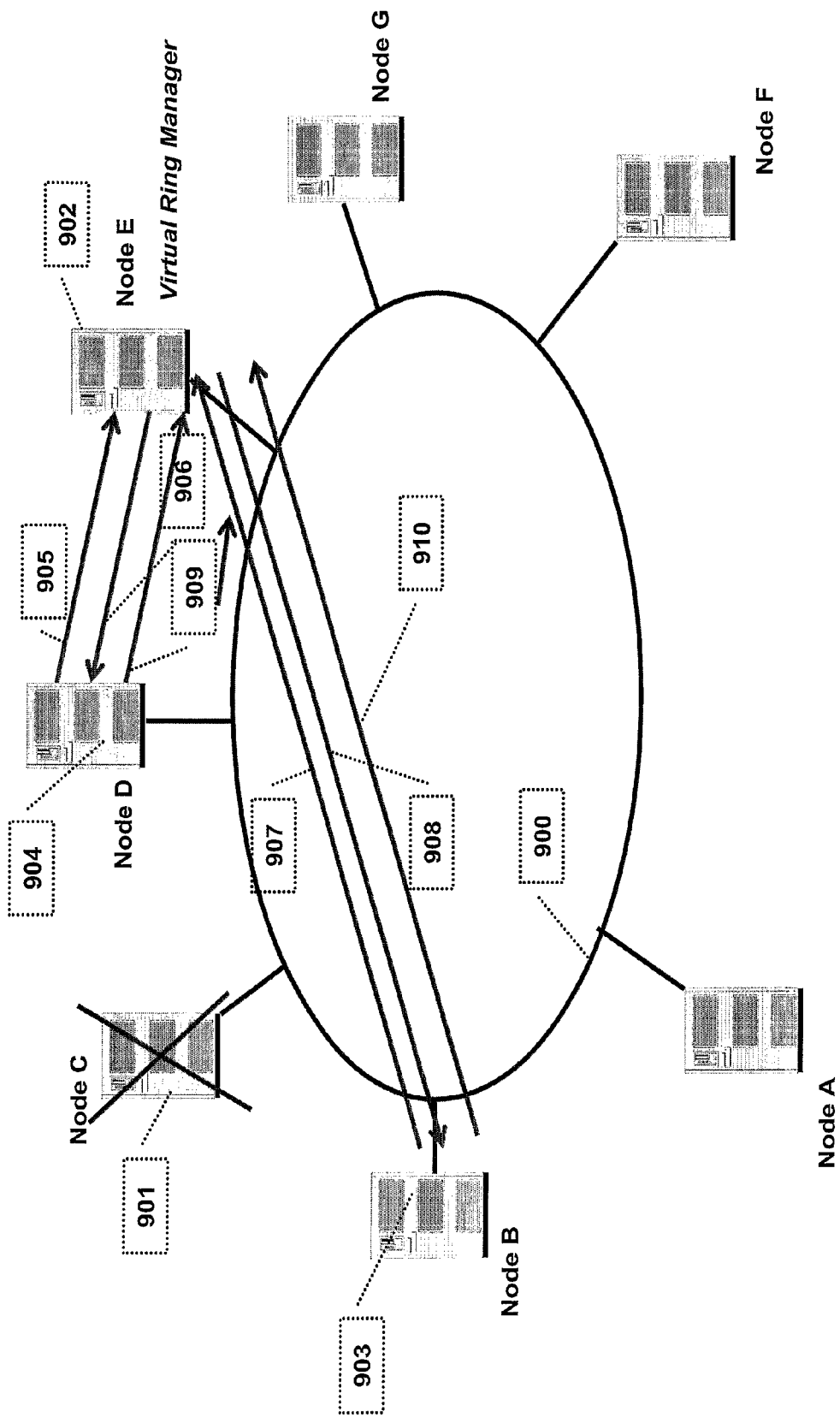
Figure 9: Loss of a Node

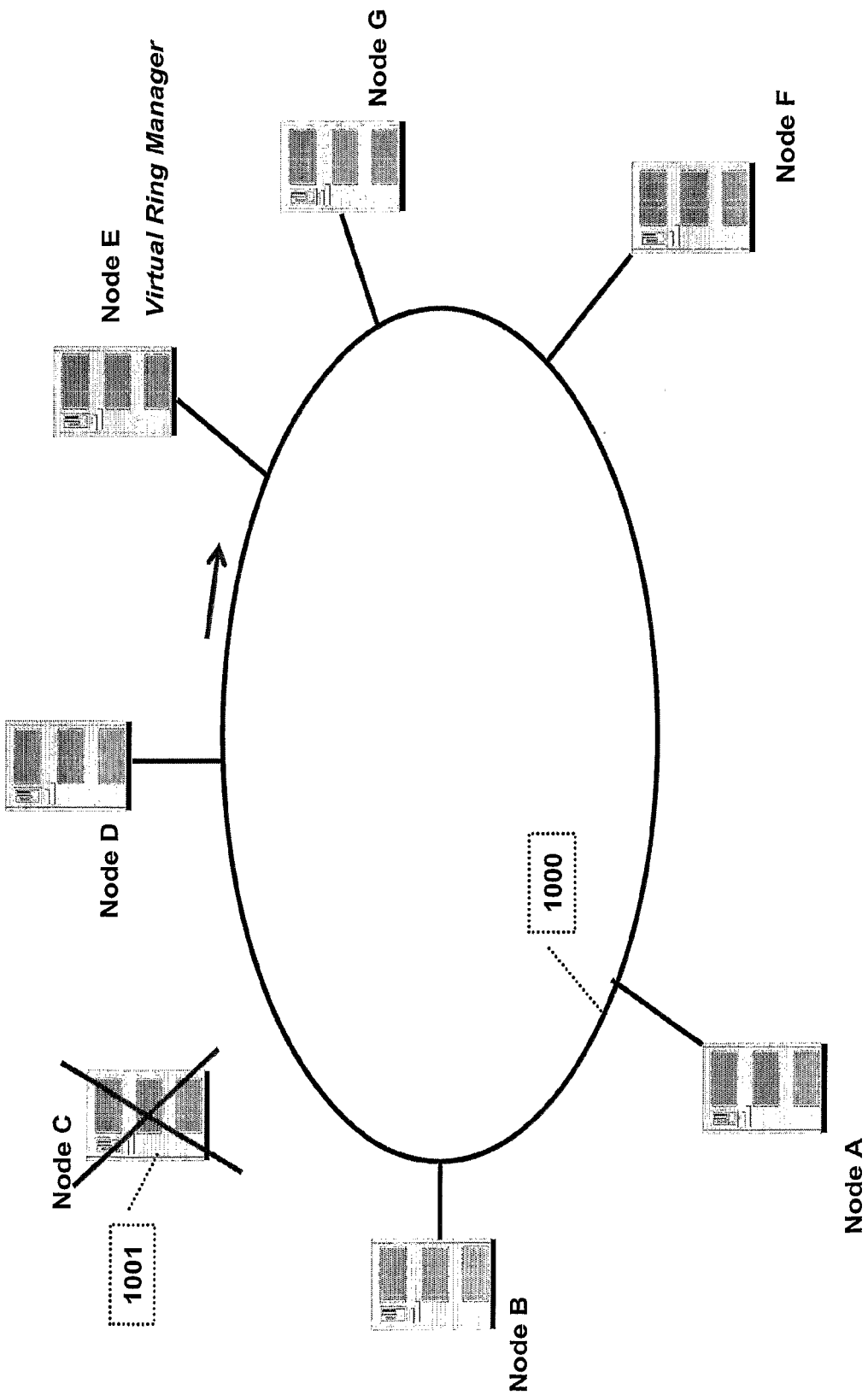
Figure 10: Loss of a Node - Result

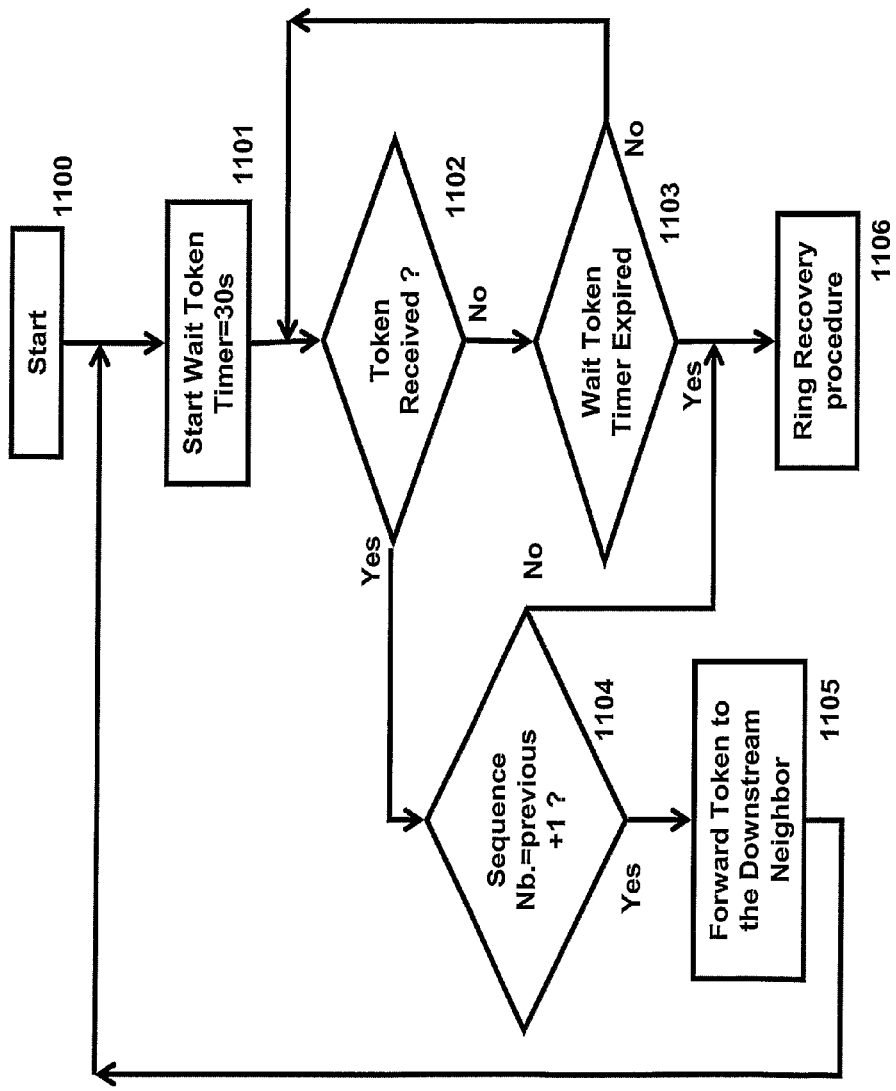
Figure 11: Token Processing by a node

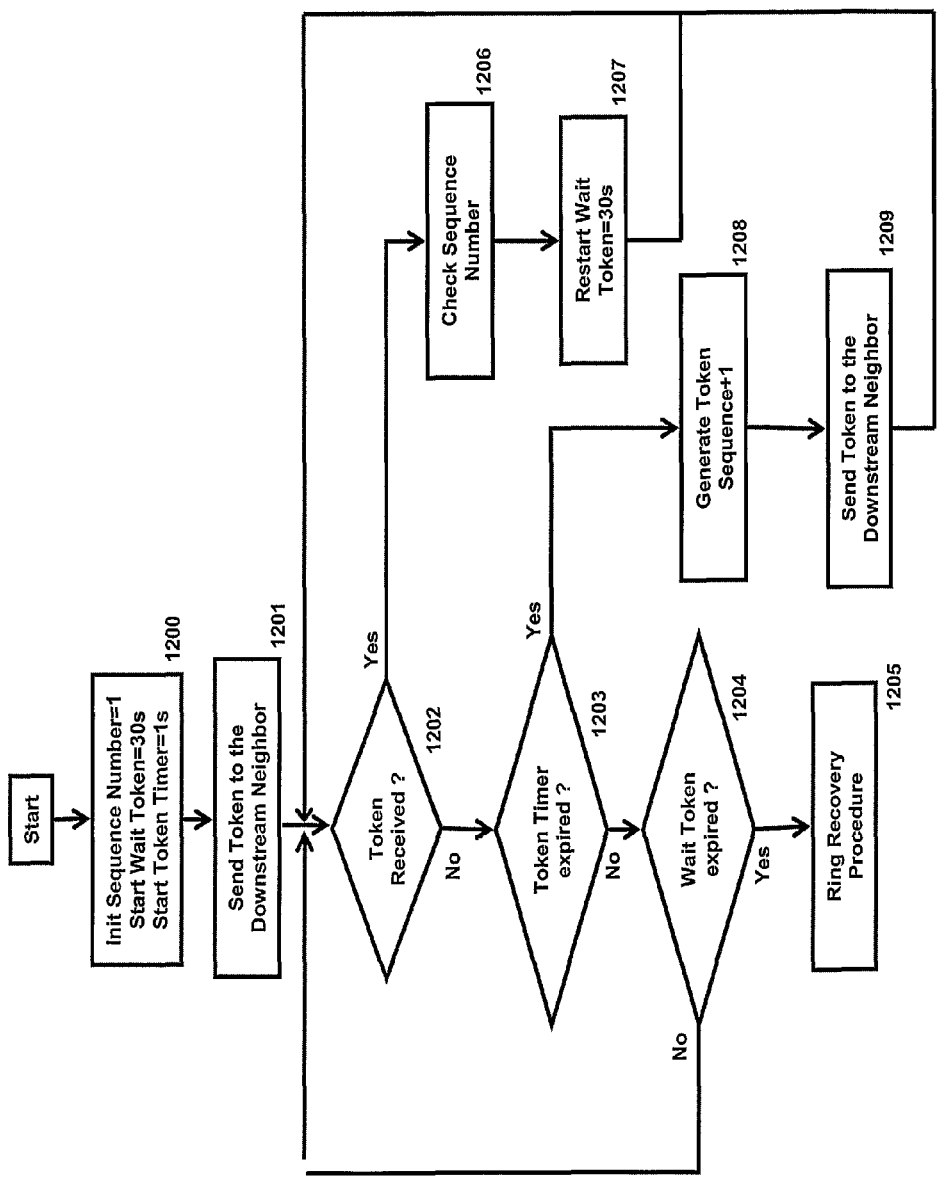
Figure 12: Virtual Ring Manager: Token Management

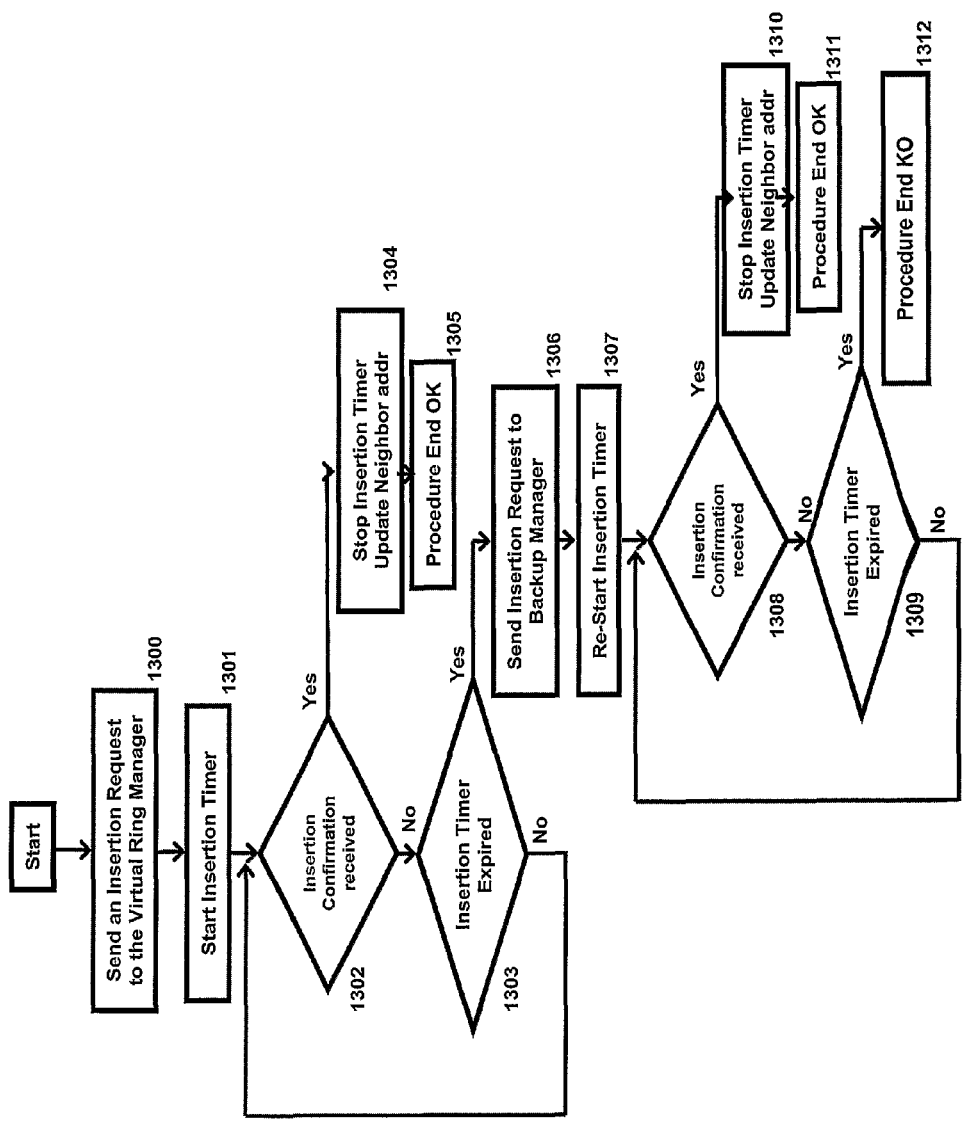
Figure 13: Node insertion - Algorithm in the inserting Node

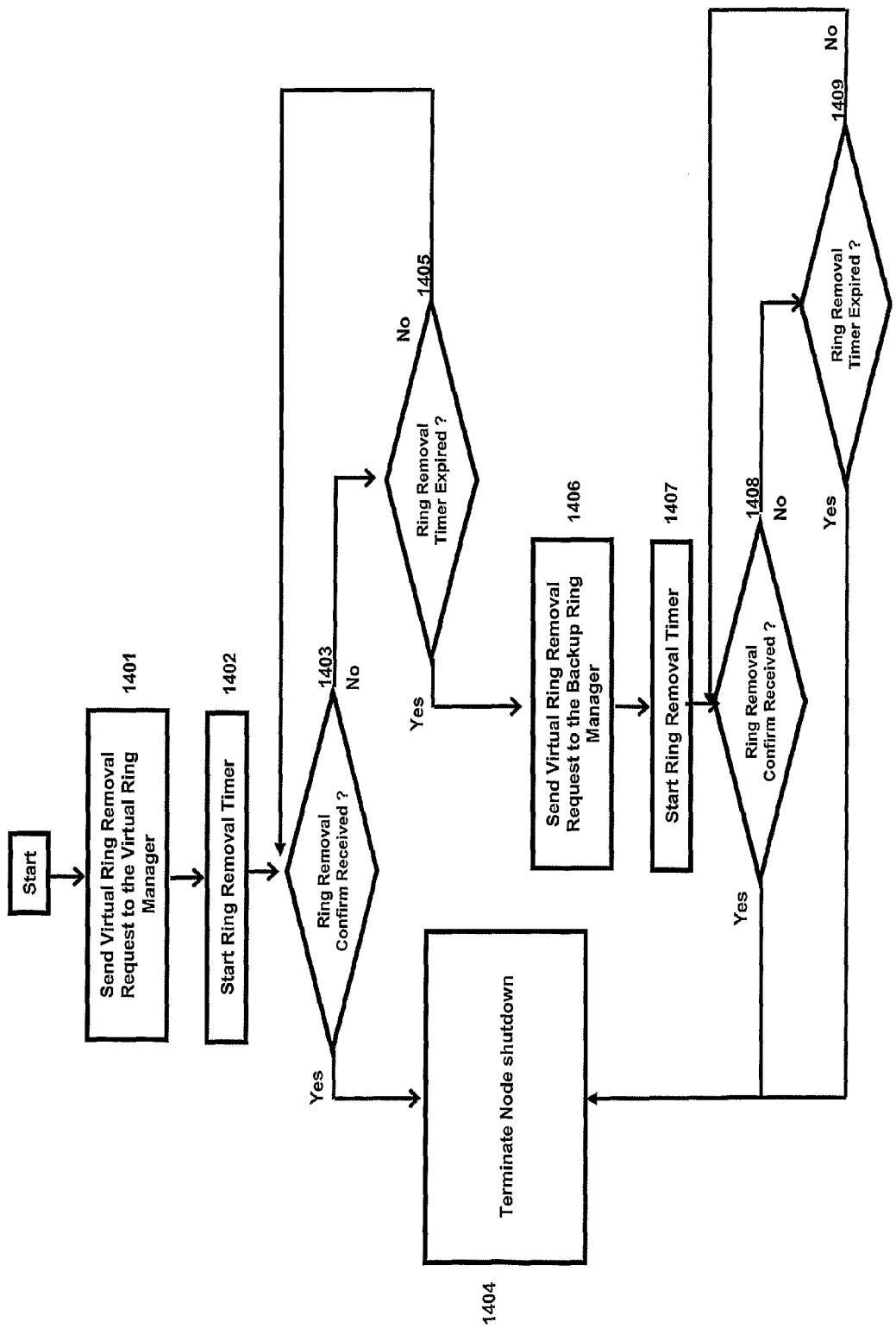
Figure 14: Node removal - Algorithm in the removing node

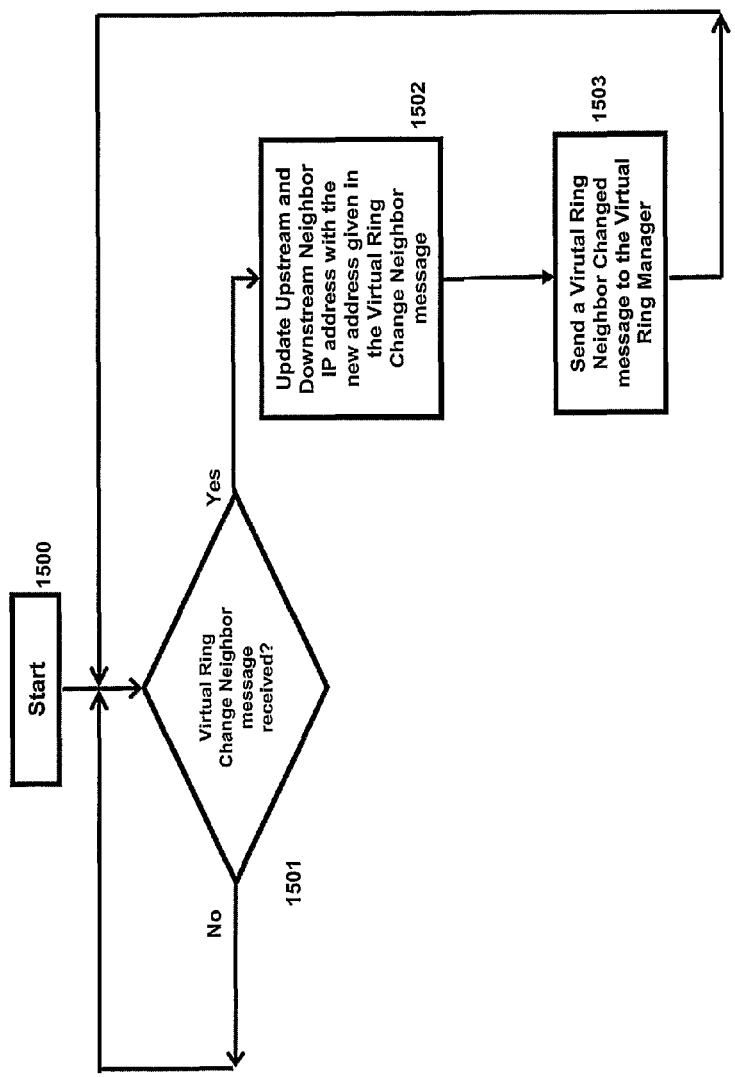
Figure 15: Node insertion/removal - Algorithm in the Adjacent Nodes

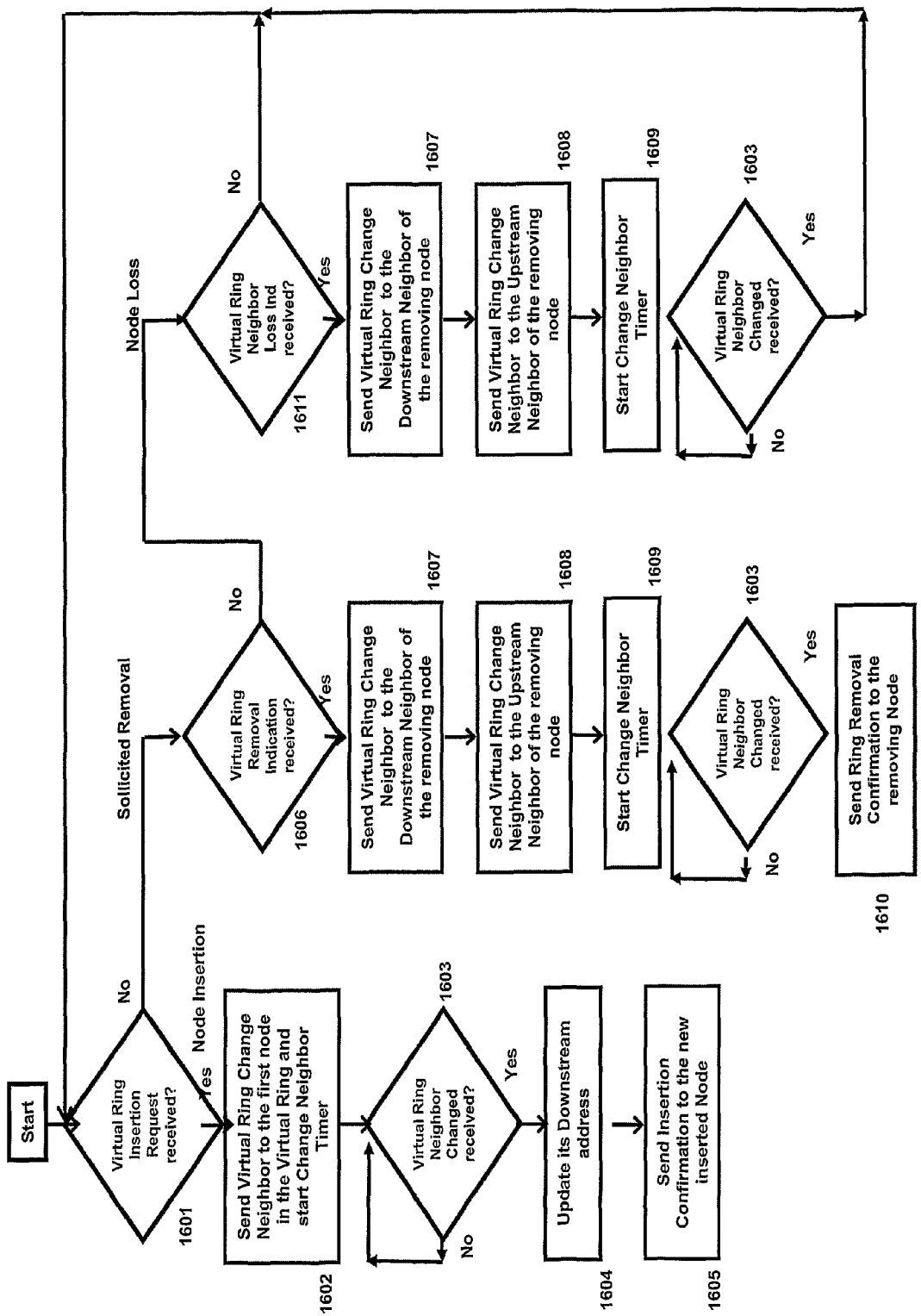
Figure 16: Node insertion/removal - Algorithm in the Virtual Ring Manager

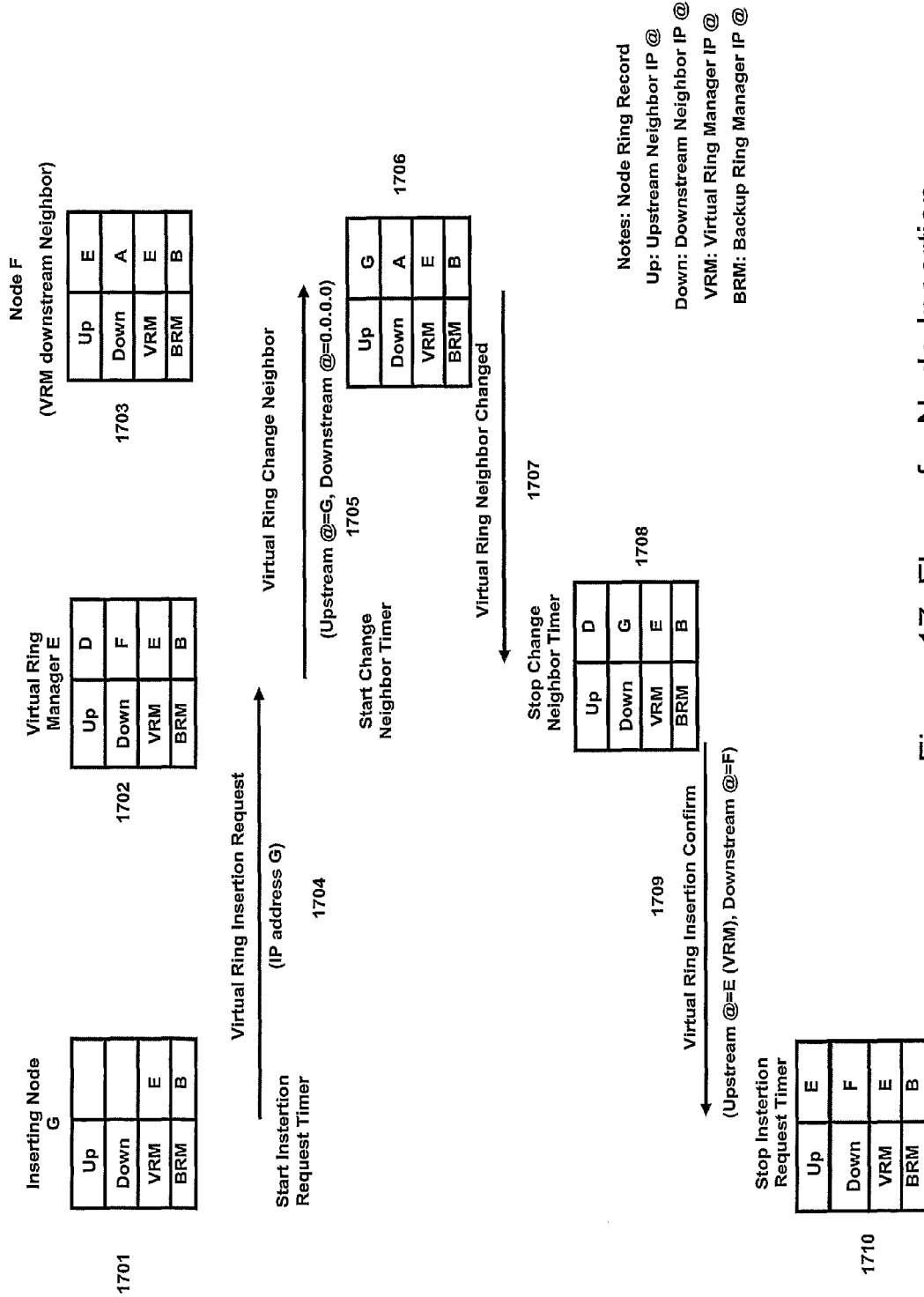

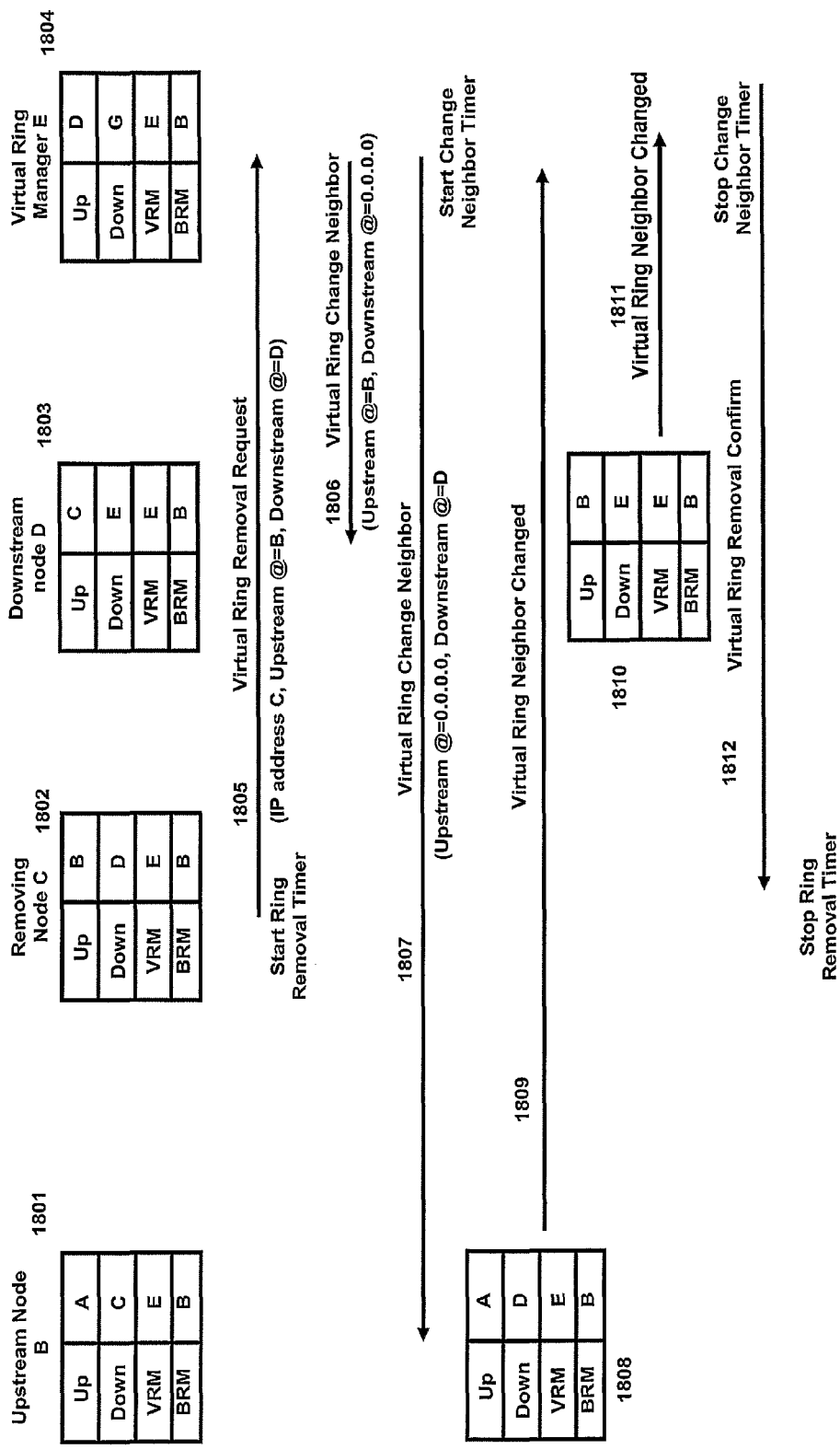
Figure 18: Flow of a Node Solicited Removal

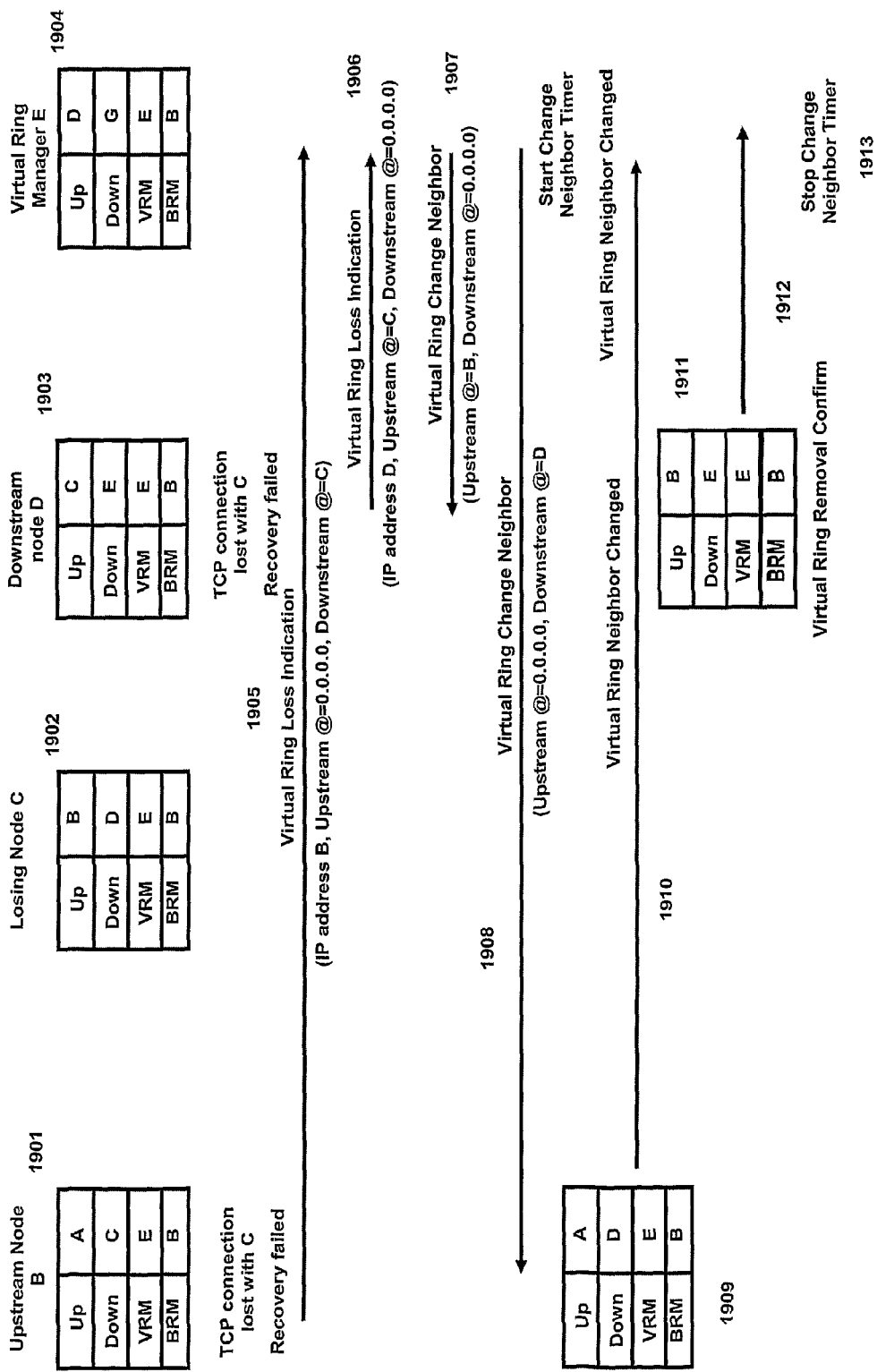
Figure 19: Flow of a Node Loss

SYSTEM AND METHOD FOR COMMUNICATING ON A VIRTUAL RING IN AN INTERNET PROTOCOL NETWORK

FIELD OF THE INVENTION

The present invention relates to communication on digital networks, and more particularly to a system and a method for creating a virtual ring between nodes in a an Internet Protocol (IP) network and for multicasting datagrams to nodes part of this virtual ring.

BACKGROUND OF THE INVENTION

In the present description, the term "Network" designates an ordinary network, based on the Internet Protocol (IP) technology. This network can be a Local Area Network (LAN), but also an Enterprise (private) Intranet or even the (public) Internet. The term "Node" designates the computer systems in the network routing the communications, such as routers, and, also, the computer systems exchanging information on the network, such as workstations and servers.

In a network, nodes must be able to exchange information with other nodes of a same group. For instance, the broadcast of a same information to multiple nodes located in different locations is called "Multicast". In a group of N nodes called a Multicast group as illustrated in FIG. 1, each node (101) needs to communicate with the (N−1) other nodes. To do this, each node establishes a session with each other node (100). Usually in IP networks, the Transmission Control Protocol (TCP) is used to communicate between nodes because this protocol allows a reliable transport of data through sessions and takes care of the flow control. This is not the case with the transport protocol called UDP (User Datagram Protocol) which is based on the best effort and which does not provide any session mechanism.

If a node, within a group of N nodes, wants to communicate information to all the other nodes of its group, it requires N−1 TCP sessions. If all the nodes need to communicate together in a full mesh configuration, N×(N−1)/2 TCP sessions are required. It is important to note that since a TCP session is bidirectional, the required number of sessions is N×(N−1)/2 and not N×(N−1).

The number of sessions can be considerable in a network comprising hundreds or thousands of nodes. It can results an important overhead with a significant impact in term of bandwidth consumption in the network and resource (data processing and memory) utilization in each node. In each node, the establishment the TCP sessions requires data processing resources and the maintenance of these TCP sessions requires memory in particular to store the context of the TCP sessions (TCP Control Block).

In absence of synchronisation at the application level, the nodes can exchange the same piece of information on all the TCP sessions at the same time (communication any to any). This is bandwidth consuming at the network level and resource consuming at the level of each node. An example of this scenario is the exchange of routing information between routers. Each router broadcast routing information to the other routers either periodically or when a change occurs, depending on the routing protocol used in the network. Another example is the synchronisation of multiple servers in a distributed database.

Several solutions exist to limit the number of sessions between nodes. A solution illustrated in FIG. 2, is to select a "Rendezvous Point", or a central node, to which all other nodes are connected. The central node (200) is responsible for distributing the information to all the other nodes in the network. This configuration called "Star network" reduces the number of connections (N−1 sessions) but the main drawback is due to the fact that the central node is the weakest point of the network. Generally, the central node is duplicated by means of a backup central node (201). This configuration called "Dual star network", requires (N−1)+(N−2) connections.

Note, the central node (200) is connected to all other nodes including the backup central node (201). The result is the establishment of N−1 TCP sessions. The addition of a second star configuration based on the backup central node (201) requires another N−1 TCP sessions. However, since a TCP session already exists between central node (200) and backup central node (201), this session does not need to be duplicated. In conclusion, the number of sessions required in a dual star configuration is (N−1)+(N−2)=2×N−3

Accordingly, it is an object of the invention to reduce bandwidth utilization in an IP network comprising inter-communicating nodes, to reduce the resource consumption of inter-communicating nodes, and to define several groups of inter-communicating nodes in an IP network.

SUMMARY OF THE INVENTION

This invention comprises a method and system for communicating among nodes in a virtual ring through a transport layer protocol.

In one aspect of the invention, a method is provided for connecting nodes in a virtual ring and for providing data transfer between the nodes. Each node in the virtual ring is logically connected according to network transport layer protocol to an upstream neighbor node and a downstream neighbor node. Datagrams are multicasted on the virtual ring by sending a virtual ring datagram to the downstream neighbor node on the virtual ring. The received datagram is identified and it is determining if the received datagram is a token, and if it is a token and the token is valid, the datagram is forwarded to the downstream neighbor node on the virtual ring. Thereafter, it is determined if the received datagram is a virtual ring datagram. If the received datagram is not locally originated, it is forwarded to the downstream neighbor node, and if the received datagram is locally originated, it is removed from the virtual ring.

In another aspect of the invention, a computer network is provided with at least two nodes having transport layer protocol to provide end to end data transfer to multicast datagrams on a virtual ring. Each node on the ring is logically connected to an upstream neighbor node and a downstream neighbor node through a virtual connection. Instructions are provided to multicast datagrams on the virtual ring. The instructions include sending a virtual ring datagram to the downstream neighbor node on the virtual ring and identifying the received datagram. If the received datagram is a token and the token is valid, it is forward to the downstream neighbor node. Similarly, if the received datagram is a virtual ring datagram, it is forwarded to the downstream neighbor node if it has not been locally originated. However, if the received datagram has been locally originated, it is removed from the virtual ring.

In yet another aspect of the invention, an article is provided with a computer network having at least two nodes having a transport layer protocol to provide end to end data transfer to multicast datagrams in a virtual ring. Each node on the virtual ring is logically connected to an upstream neighbor node and a downstream neighbor node through a virtual connection. The article includes a computer readable medium in the network having instructions for multicasting datagrams on the virtual ring. The instructions include instructions for sending a virtual ring datagram to the downstream neighbor node, and instructions for identifying the datagram upon receipt. If the received datagram is a valid token, instructions are provided for forwarding the token to the downstream neighbor node. Similarly, instructions are provided for determining if the received datagram is a virtual ring datagram. Instructions are provided for forwarding the datagram to the downstream neighbor node if the received datagram has not been locally originated, and instructions are provided for removing the received datagram from the virtual ring if the received datagram has been locally originated.

The foregoing, together with other objects, features, and advantages of this invention can be better appreciated with reference to the following specification, claims and drawings.

BRIEF DESCRIPTION OF THE DRAWINGS

The new and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 1 shows an example of "Full mesh network".

FIG. 2 shows an example of "Star network".

FIG. 3 shows an example of "Virtual Ring network" according to the present invention.

FIG. 4 shows how a token is forwarded from node to node on a Virtual Ring according to the present invention.

FIG. 5 shows the token message according to the present invention.

FIG. 6 shows how a new node is inserted into the Virtual Ring according to the present invention.

FIG. 7 shows the result of a new node insertion according to the present invention.

FIG. 8 shows the solicited removal of a node according to the present invention.

FIG. 9 shows the loss of a node according to the present invention.

FIG. 10 shows the result of a reconfiguration after the loss of a node according to the present invention.

FIG. 11 describes the algorithm executed by a node when this node receives the token according to the present invention.

FIG. 12 describes the algorithm executed in the Virtual Ring Manager at receipt of the token according to the present invention.

FIG. 13 describes the algorithm executed in a node in view of inserting this node into the Virtual Ring according to the present invention.

FIG. 14 describes the algorithm executed in a node in view of removing this node from the Virtual Ring according to the present invention.

FIG. 15 illustrates the algorithm executed in a node when a neighbour node has been inserted or removed according to the present invention.

FIG. 16 illustrates the algorithm executed in the Virtual Ring Manager when a node is inserted or removed from the Virtual Ring according to the present invention.

FIG. 17 illustrates the Node Insertion process according to the present invention.

FIG. 18 illustrates the Solicited Node Removal process according to the present invention.

FIG. 19 illustrates the unsolicited Node Removal process according to the present invention.

DESCRIPTION OF THE PREFERRED EMBODIMENT

The present invention discloses a network topology based on a virtual ring as shown in FIG. 3 at (300). The N nodes of the network that need to communicate together, are logically/virtually connected according to a virtual ring, each node communicating with two and only two neighbour nodes: an upstream neighbour node and a downstream neighbour node.

Although the present invention applies to any types of nodes, this invention is particularly interesting when several nodes need to exchange a same piece of information between them.

DESCRIPTION OF THE INVENTION

Several virtual rings can be implemented on a same physical network, each virtual ring allowing a subset of nodes to communicate together. A same node can participate to several virtual rings at the same time. Each virtual ring is identified by a unique Virtual Ring identifier, e.g. Virtual Ring Id. The Virtual Ring identifier is statically configured in all the nodes participating in the virtual ring. The way the virtual ring is initiated and managed will be described hereafter.

TCP/IP Protocol

In a preferred embodiment, the current invention is implemented on top of the TCP layer of the TCP/IP protocol, which is today the protocol the most largely used in the world. However, the invention only uses the transport function of TCP. It is also possible to implement the invention on top of any other protocol stack providing the transport function, such as IPX (Internetwork Packet Exchange). IP has been chosen in the present description because this protocol is used in most of the networks. The transport function of TCP brings some reliability because this function handles transmission problems such as packet losses. The circulation of information along the virtual ring is based on the Internet Protocol (IP) and the Transmission Control Protocol (TCP). TCP has been chosen because it allows a sending of packets without risk of loss. TCP also informs of the loss of the remote node by maintaining a connection. The use of TCP and IP allows to extend the virtual ring to any part of an IP network including the Internet itself. It is possible to imagine nodes in different parts of the world, communicating together with such a virtual ring.

The User Datagram Protocol (UDP) can also be used in the current invention for instance to exchange Ring Insertion and Ring Removal messages between a specific node and the Virtual Ring Manager. Since these messages are exchanged only during the insertion or removal process, there is no need to use the TCP protocol and to establish a TCP session.

The present invention requires a new specific piece of code in each node part of the ring network. This code uses a specific TCP port and a specific UDP port reserved for the invention. This code is used to establish, maintain and tear down the virtual ring topology Token In order to maintain the ring topology, some pieces of information need to be periodically exchanged between the different nodes. One of these pieces of information is called "token", referring to the "Token Ring" architecture developed by IBM (IBM is a trademark of International Business Machines Corporation) these last decades. FIG. 4 describes a token (401) circulating between node A and node B on a virtual ring (400).

The token is used as a periodic keepalive message to validate the ring topology. The token is periodically generated by the Virtual Ring Manager (402) and forwarded by each node to its downstream neighbour node. The receipt by the Virtual Ring Manager of the token (from its upstream neighbour node), indicates that the ring topology is valid and the loop is not broken. If the ring is broken for some reason, such as loss of one node or loss of connectivity between 2 neighbour nodes, the loss of the token will indicate that there is a problem on the ring. Each node monitors the reception of the token. If the token has not been received after a certain amount of time, each node will trigger the Ring Recovery process detailed here after. The token is forwarded from node to node, just like any other piece of information. This means that the Token uses the TCP sessions established between the nodes.

The Sequence Number field is used to identify the current copy of the token.

| Token structure | | |
|---|---|---|
| IP Header | IP Header | Virtual Ring Token Message Code 0x0001 Virtual Ring Identifier (2 bytes) Sequence Number (4 bytes) |

The Token is described in FIG. 5
- IP header (500): source IP address of the sending node and destination IP address of the next node in the virtual ring
- TCP header (501): source and destination ports=well known port reserved for the current invention
- Virtual Ring Token (502): This message contains 3 fields:
  1. Message code (503), set to 0x0001. Allows to identify that the type of message is a Token.
  2. Virtual Ring Identifier (504) on 2 bytes: identify the Virtual Ring. This allows a same node to participate to multiple Virtual Rings.
  3. Sequence Number (505) on 4 bytes: it is set and incremented by the Virtual Ring Manager. This allows the Virtual Ring Manager to detect a possible duplication of the token.

Data Propagation Along the Virtual Ring

When a node participating in the virtual ring receives a datagram from its upstream neighbour node, it processes this datagram, i.e. stores the data part of the received message, and forwards it to its downstream neighbour node so that the datagram can circulate along the virtual ring. However, a node connected to the virtual ring must be able to recognize a datagram circulating along the virtual ring versus a normal IP datagram received from another node which does not participate in the virtual ring. To do so, datagrams exchanged on the virtual ring have the following encapsulation:

| IP Header (20 bytes) | TCP Header Source/Dest Port (20 bytes) | Virtual Ring Header Message Code 0x0000 Virtual Ring Identifier (2 bytes) Sender IP address (4 bytes) | Data |
|---|---|---|---|

The encapsulation of the Data inside a TCP datagram has the following advantage: the datagram is transmitted along the Virtual Ring using the reliable TCP protocol. The Virtual Ring Header comprises the following fields:
1. Message code: indicates that the received message is a datagram
2. Virtual Ring Identifier: indicates on which Virtual Ring the message must be forwarded. A node may belong to multiple Virtual Rings.
3. Sender IP address: This is the IP address of the node who has generated the data.

Transmission of a Datagram on the Virtual Ring
1. When a node needs to send a datagram on the Virtual Ring, this node adds the Virtual Ring Header described above, and encapsulates the data inside a TCP datagram. This datagram is sent to the downstream neighbour on the Virtual Ring.
2. Each node on the Virtual Ring checks the sender address to see which node has generated the datagram. Each node then reads the data, processes it, and forwards the datagram to its downstream neighbour.
3. When the datagram is received back by the sender Node the sender Node checks the Sender IP address in the Virtual Ring Header, then the Sender Node removes the datagram from the Virtual Ring. This just means that the datagram is deleted and not forwarded to the downstream neighbour node again.

Virtual Ring Topology

The virtual ring is a list of nodes connected to form a ring. No node has the complete view of the ring. This list of nodes participating in the ring is stored nowhere in the network. Each node comprises the following information (Node Ring Record)

| |
|---|
| Virtual Ring Identifier (2 bytes) (configured) |
| Upstream Neighbor IP address (4 bytes) |
| Downstream Neighbour IP address (4 bytes) |
| Virtual Ring Manager IP address (configured) (4 bytes) |
| Backup Virtual Ring Manager IP address (configured) (4 bytes) |

Virtual Ring Manager

One of the nodes participating in the virtual ring plays the role of "Virtual Ring Manager". The Virtual Ring Manager is responsible for maintaining the topology of the virtual ring, more particularly the Virtual Ring Manager is responsible for the insertion and removal of the nodes.

It is important to note that the Virtual Ring Manager IP address is statically configured in each node of the virtual ring. Since the Virtual Ring Manager constitutes a single point of failure, a Backup Virtual Ring Manager is generally used. The IP address of the Backup Virtual Ring Manager is also statically configured in each node. When a node wants to be inserted into the virtual ring and does not receive any response from the Virtual Ring Manager, this node will contact the Backup Virtual Ring Manager.

Insertion of a Node in the Virtual Ring

FIG. 6 describes the insertion of a new node G (601) into a virtual ring (600) comprising nodes A, B, C, D, E, F. When a new node G (601) wants to join the virtual ring (600), the following scenario occurs:

Note: in a preferred embodiment, all the insertion messages use the UDP protocol and the reserved UDP port defined in the current invention.

The Node (601) to insert in the virtual ring (Node G), sends a "Virtual Ring Insertion Request" message (603) to the Virtual Ring Manager (602) using the configured IP address of the Virtual Ring Manager. The Node (601) to insert starts an "Insertion Request" timer and waits for a "Virtual Ring Insertion Confirmation" message (604).

The Virtual Ring Manager (602) receives the "Virtual Ring Insertion Request" message and notes the source IP address of the message, which is the IP address of Node G (601).

The Virtual Ring Manager (602) sends a "Virtual Ring Change Neighbour" message (605) to its downstream neighbour Node F (606). The Virtual Ring Manager finds the IP address of Node F in its Node Ring Record. The "Virtual Ring Change Neighbour" message comprises the IP address of Node G (601) as Upstream Neighbour IP address. The Downstream Neighbour IP address in the message is set to 0.0.0.0 because this address does not need to be changed.

Node F (606) receives the "Virtual Ring Change Neighbour" message (605). Node F tears the TCP session down with its upstream neighbour Node (the Virtual Ring Manager), by issuing a "TCP Reset" message. Node F (606) stores the IP address of Node G (601) received in the "Virtual Ring Change Neighbour" Message (605), in its Node Ring Record (Upstream Neighbour IP address).

Node F (606) establishes a TCP session with its new upstream neighbour Node, (Node G (601)) and sends a "Virtual Ring Neighbour Changed" message (607) to the Virtual Ring Manager (602) to indicate that Node F has changed its upstream neighbour Node.

The Virtual Ring Manager (602) receives the "TCP Reset" message from Node F (606) and tears the TCP session down. The Virtual Ring Manager establishes a new TCP session with Node G (601) and stores the IP address of Node G (601) in its Node Ring Record: Downstream Neighbour IP address.

The Virtual Ring Manager (602) sends a "Virtual Ring Insertion Confirmation" message (604) to Node G (601). This message comprises the IP address of Node F (606).

Node G (601) updates its Node Ring Record with:
 an Upstream Neighbour IP address equal to the Virtual Ring Manager IP address, and
 an Downstream Neighbour IP address equal to the IP address of Node F.

Node G (601) stops the "Insertion Request" timer.

If the "Insertion Request" timer expires, this means that Node G (601) has not received the "Virtual Ring Insertion Confirmation" message (604) from the Virtual Ring Manager (602). In that case, Node G (601) contacts the Backup Virtual Ring Manager (608). This process is described below in the section related to the Backup Virtual Ring Manager.

The result of the insertion of node G is described in FIG. 7. Node G (701) is now inserted on the virtual ring (700), between the Virtual Ring Manager (702) and Node F (703).

Solicited Removal of a Node from the Virtual Ring

The solicited node removal scenario described in the present section corresponds to the case where a node wants to be removed from the Virtual Ring because it does not want to participate any more in the group. Another node removal scenario corresponds to the case where a node has a failure and the virtual ring is broken. This unsolicited removal scenario will be described in another section. FIG. 8 describes the Node Solicited removal process. When Node C (801) wants to be removed from the virtual ring, the following scenario occurs:

Node C (801) sends a "Virtual Ring Removal Request" message (803) to the Virtual Ring Manager (802). This message comprises
 the IP address of Node C (801),
 the IP address of its upstream neighbour node, Node B (804), and
 the IP address of its downstream neighbour node, Node D (805).

Node C (801) starts a "Ring Removal" Timer and waits for a "Virtual Ring Removal Confirmation" message (806)

The Virtual Ring Manager (802) receives the "Virtual Ring Removal Request" message (803) from Node C (801) and starts the removal process. It notes the IP addresses of the upstream neighbour node and downstream neighbour node of Node C.

The Virtual Ring Manager (802) sends a "Virtual Ring Change Neighbour" message (807) to Node B (804), upstream neighbour node of the node to remove, Node C (801). This message comprises:
 the unchanged Upstream Node IP address: 0.0.0.0;
 the Downstream Node IP address equal to the IP address of Node D (805), which is the downstream neighbour node of Node C (801)

The Virtual Ring Manager (802) sends a "Virtual Ring Change Neighbour" message (808) to Node D (805), downstream neighbour node of the node to remove, Node C (801). This message comprises:
 the Upstream Node IP address equal to the IP address of Node B (804), which is the upstream neighbour node of Node C (801);
 the unchanged Downstream Node IP address: 0.0.0.0.

The Virtual Ring Manager (802) starts a "Change Neighbour" Timer of, for instance, 30 s waiting for the confirmations.

Node B (804) receives the "Virtual Ring Change Neighbour" message (807) from the Virtual Ring Manager (802) and modifies its Node Ring Record.

The Upstream Node IP address in the message is 0.0.0.0. This means that the address does not need to be changed. Node B (804) keeps Node A (809) as its Upstream Neighbour node. On the other hand, Node B (804) modifies its Downstream Neighbour IP address and uses the address received in the message. Node B (804) tears the TCP connection down with Node C (801) which was its previous downstream neighbour node, and establishes a new TCP connection with its new downstream neighbour node, Node D (805).

Node B (804) sends a "Virtual Ring Neighbour Changed" message (810) to the Virtual Ring Manager (802).

Node D (805) does the same as Node B (804). It updates its Node Ring Record, tears the TCP session it had with its Upstream Neighbour, Node C (801) down, and establishes a TCP session with its new Upstream Neighbour, Node B (804). Node D (805) sends a "Virtual Ring Neighbour Changed" message (811) to the Virtual Ring Manager (802)

When the Virtual Ring Manager receives the "Virtual Ring Neighbour Changed" messages from both nodes B and C, it stops the "Change Neighbour" timer and sends a "Virtual Ring Removal Confirmation" message (806) to node C (801) to indicate that the Removal process has been successful.

Node C (801) stops the "Ring Removal" Timer. If the "Ring Removal" Timer expires, it means that the Virtual Ring Manager (802) has not achieved the Removal process. In this case, Node C (801) must contact the Backup Virtual Ring Manager (804).

Loss of a Node

The loss of a node in the virtual ring network is detected by its neighbour nodes with the loss the TCP connections. When a node is removed from the virtual ring without informing the Virtual Ring Manager by means of a "Virtual Ring Removal Request" message, which should be the case when a node failure occurs, the 2 neighbour nodes, e.g. the upstream neighbour node and the downstream neighbour node, lose their TCP connection with this node a given period of time (after a TCP timeout). As described in FIG. 9; the following scenario occurs:

- Node C (901) in the virtual ring network (900), fails or is powered off.
- Node B (903), the upstream neighbour node of Node C (901), loses its TCP connection with Node C. Node B attempts to re-establish its TCP connection without success.
- Node D (904), downstream neighbour node of Node C (901), loses its TCP connection with Node C. Node D attempts to re-establish its TCP connection without success.
- Node B (903) sends a "Virtual Ring Neighbour Loss Indication" (907) message to the Virtual Ring Manager (902). This message comprises:
  - the Node B IP address, and
  - the Node B Downstream Neighbour IP address, i.e. address of Node C (901).
- The Upstream Neighbour IP address is set to 0.0.0.0 because no problem has been found with the upstream neighbour node of Node B.
- Node D (904) sends a "Virtual Ring Neighbour Loss Indication" (905) message to the Virtual Ring Manager (902). This message comprises:
  - the Node D IP address, and
  - the Node D Upstream Neighbour IP address, i.e. address of Node C (901).
- The Downstream Neighbour IP address is set to 0.0.0.0 because no problem has been found with downstream neighbour node of Node D.
- The Virtual Ring Manager (902) receives both messages from Node C upstream neighbour node and Node C downstream neighbour node. The virtual ring needs to be reconfigured.
- The Virtual Ring Manager (903) sends a "Virtual Ring Change Neighbour" message (906) to Node D (904). This message comprises:
  - an Upstream Neighbour IP address equal to the Node B IP address
  - an unchanged Downstream Neighbour IP address equal to 0.0.0.0 (the IP address does not need to be changed)
- Node D (904) updates the Upstream Neighbour IP address in its Node Ring Record and establishes a TCP connection with its new upstream neighbour node (Node B (903)).
- Node D (904) sends a "Virtual Ring Node Changed" (909) message back to the Virtual Ring Manager (902) to confirm the change.
- The Virtual Ring Manager (903) sends a "Virtual Ring Change Neighbour" message (908) to Node B (903) comprising:
  - an unchanged Upstream Neighbour IP address equal to 0.0.0.0 (the IP address does not need to be changed)
  - a Downstream Neighbour IP address equal to the Node D IP address.
- Node B (903) updates the Downstream Neighbour IP address in its Node Ring Record.
- Node B (903) sends a "Virtual Ring Node Changed" message (910) back to the Virtual Ring Manager (902) to confirm the change.

FIG. 10 shows the result of the virtual ring (1000) reconfiguration after the loss of Node C (1001).

Backup Virtual Ring Manager

The Backup Virtual Ring Manager executes the same processes as the Virtual Ring Manager. The Backup Virtual Ring Manager receives Insertion, Removal and Recovery messages from the nodes in absence of response from the Virtual Ring Manager, and processes these messages like the Virtual Ring Manager.

Token Loss Recovery

All the nodes including the Virtual Ring Manager, use a timer to detect the loss of the token. When the token is lost, the ring needs to be rebuilt. The value of this timer must be larger than the TCP session timer to allow the process described in section entitled "Loss of a node" to take place before the reconfiguration of the ring. When a node detects the loss of the token, it sends a "Virtual Ring Removal Request" message to the Virtual Ring Manager and waits for the confirmation as described in FIG. 8 (refer to section entitled "Solicited Node Removal"). After a given period of time, the node will send a "Virtual Ring Insertion Request" message to the Virtual Ring Manager to participate again in the ring as described in FIG. 6 (section entitled "Insertion of a Node").

Insertion and Removal Messages

These messages are exchanged using the User Datagram Protocol (UDP). The value of the Virtual Ring Identifier field is used to identify the current virtual ring. The Virtual Ring Identifier is statically configured in each participating node.

| General Format | | |
|---|---|---|
| IP Header | TCP Header Source/Dest Port | Virtual Ring Message Message Code 0x.. Virtual Ring Identifier (2 bytes) ... |

| Virtual Ring Insertion Request | | |
|---|---|---|
| Message Code 0x0002 | Virtual Ring Identifier (2 bytes) | Inserting Node IP address (4 bytes) |

| Virtual Ring Insertion Confirmation | | | |
|---|---|---|---|
| Message Code 0x0003 | Virtual Ring Identifier (2 bytes) | Upstream Neighbour IP address (4 bytes) | Downstream Neighbour IP address (4 bytes) |

| Virtual Ring Change Neighbour | | | |
|---|---|---|---|
| Message Code 0x0004 | Virtual Ring Identifier (2 bytes) | Upstream Neighbour IP address (4 bytes) | Downstream Neighbour IP address (4 bytes) |

| Virtual Ring Neighbour Changed | | | |
|---|---|---|---|
| Message Code 0x0005 | Virtual Ring Identifier (2 bytes) | Upstream Neighbour IP address (4 bytes) | Downstream Neighbour IP address (4 bytes) |

| Virtual Ring Removal Request | | | | |
|---|---|---|---|---|
| Message Code 0x0006 | Virtual Ring Identifier (2 bytes) | Removing Node IP address (4 bytes) | Upstream Neighbour IP address (4 bytes) | Downstream Neighbour IP address (4 bytes) |

| Virtual Ring Removal Confirmation | |
|---|---|
| Message Code 0x0007 | Virtual Ring Identifier (2 bytes) |

| Virtual Ring Neighbour Loss Indication | | | | |
|---|---|---|---|---|
| Message Code 0x0008 | Virtual Ring Identifier (2 bytes) | Upstream Neighbour IP address (4 bytes) | Downstream Neighbour IP address (4 bytes) | Node IP address (4 bytes) |

Processes According to the Present Invention

Token Processing in a Node

FIG. 11 describes the algorithm executed by a node when this node receives the Token.

(1100) The Node has just been inserted into the virtual ring.

(1101) The Node starts the Wait Token Timer (30 seconds) and waits for the receipt of the Token (1102) The Node checks whether the Token has been received or not.

(1103) If no Token has been received, the Node checks whether the Token Timer has expired or not. If the Token Timer has not expired, the Node continues to wait for the Token.

(1104) If the Token has been received, the Node checks the Token Sequence number to verify that it has been incremented since the last reception. If the Token is received for the first time (just after the node insertion), this test is not executed.

(1105) If the Token Sequence number in the received Token is correct, the Node forwards the Token to its downstream neighbour node and waits for the Token again.

(1106) If no Token has been received and if the Token Timer has expired, or if the received Token do not have the expected Token Sequence number (this means that a Token has been lost), then the Ring Recovery Procedure is executed.

Token Processing in the Virtual Ring Manager

FIG. 12 describes the algorithm executed in the Virtual Ring Manager at receipt of the Token.

(1200) The Virtual Ring Manager has just been inserted. It sets the Token Sequence number to 1, starts a Wait Token Timer of 30 seconds and a Token Timer of 1 second. The Token Timer is used to generate a new Token every second. The Wait Token Timer is used to trigger the ring recovery.

(1201) The Virtual Ring Manager forwards the Token to its downstream neighbour node and waits for the return of the Token.

(1202) The Virtual Ring Manager checks whether the Token has been received or not.

(1203) If the Token has not been received, the Virtual Ring Manager checks whether the Token Timer has expired or not.

(1204) If the Token Timer has not expired, the Virtual Ring Manager checks whether the Wait Token Timer has expired or not. If not, the Virtual Ring Manager waits for the Token again.

(1205) If no Token has been received and if the Wait Token Timer has expired, this means that the Token has been lost. Then the Virtual Ring Manager executes the ring recovery procedure.

(1206) If the token is received, the Virtual Ring Manager checks the sequence number in the Token.

(1207) The Virtual Ring Manager restarts the Wait Token Timer because the token has been received and waits for the Token timer to expire.

(1208) When the Token Timer expires, the Virtual Ring Manager generates a new token, and increments the sequence number (1209) The Virtual Ring Manager forwards the Token to its downstream neighbour node and waits for the return of the Token.

Node Insertion—Algorithm in the Node

FIG. 13 describes the algorithm executed in a node in view of inserting this node into the virtual ring.

(1300) A new Node wants to be inserted into the Virtual Ring. This Node sends a "Virtual Ring Insertion Request" message to the Virtual Ring Manager.

(1301) the Node starts the Insertion Timer and waits for an "Virtual Ring Insertion Confirmation" message from the Virtual Ring Manager.

(1302) the Node checks whether an "Virtual Ring Insertion Confirmation" message has been received or not.

(1303) If no "Virtual Ring Insertion Confirmation" message has been received, the Node checks if the Insertion Timer has expired. If not, the Node continues to wait for the receipt of an "Virtual Ring Insertion Confirmation" message.

(1304) If an "Virtual Ring Insertion Confirmation" message has been received, the Node stops the Insertion Timer, updates its neighbour addresses and establishes TCP sessions with its neighbour nodes.

(1305) the new Node is now inserted into the virtual ring.

(1306) If no "Virtual Ring Insertion confirmation" message has been received and if the Insertion Timer has expired, the Node sends a "Virtual Ring Insertion Request" message to the Backup Manager.

(1307) the Node starts the Insertion Timer again.

(1308) The Node checks whether an "Virtual Ring Insertion Confirmation" message has been received or not.

(1309) If no "Virtual Ring Insertion Confirmation" message has been received, the Node checks whether the Insertion Timer has expired or not. If not, the Node continues to wait for the receipt of an "Insertion Confirmation" message.

(1310) If a "Virtual Ring Insertion Confirmation" message has been received, the Node stops the Insertion Timer, updates its neighbour addresses and establishes TCP sessions with its neighbour nodes.

(1311) the new Node is now inserted into the virtual ring.

(1312) if no "Virtual Ring Insertion Confirmation" message has been received from the Backup Manager, this means that both the Virtual Ring Manager and the Backup Manager are unavailable. In this case, the process for inserting the Node in the ring has failed.

Node Removal—Algorithm in the Node

FIG. 14 describes the algorithm executed in a node in view of removing this node from the virtual ring.

(1401) A Node wants to be removed from the virtual ring. This Node sends a "Virtual Ring Removal Request" message to the Virtual Ring Manager (1402) The Node to remove starts the Ring Removal Timer.

(1403) The Node to remove waits for a "Virtual Ring Removal Confirmation" message from the Ring Manager.

(1404) When the "Virtual Ring Removal Confirmation" message is received, the Node terminates its shutdown.

(1405) If no "Virtual Ring Removal Confirmation" message is received, the Node to remove checks the Ring Removal Timer.

(1406) If the Ring Removal Timer has expired, the Node to remove sends a "Virtual Ring Removal Request" message to the Backup Ring Manager (1407) The Node to remove starts the Ring Removal Timer.

(1408) The Node to remove waits for the "Virtual Ring Removal Confirmation" message from the Ring Manager.

(1409) If no "Virtual Ring Removal Confirmation" message is received, the Node to remove checks the Ring Removal Timer.

(1404) If this timer expires, then the Node to remove terminates its shutdown without waiting for any response from the Ring Manager.

Node Insertion/Removal—Algorithm in the Adjacent Node

FIG. 15 illustrates the algorithm executed in a node when a neighbour node has been inserted or removed.

(1501) The Adjacent Node checks if a "Virtual Ring Change Neighbour" message has been received from the Virtual Ring Manager.

(1502) If a "Virtual Ring Change Neighbour" message has been received, the Adjacent Node updates its neighbour table using the upstream and downstream addresses received in the message.

(1503) The Adjacent Node sends back a "Virtual Ring Neighbour Changed" message to the Virtual Ring Manager.

Node Insertion/Removal—Algorithm in the Virtual Ring Manager

FIG. 16 illustrates the algorithm executed in the Virtual Ring Manager when a node is inserted or removed from the virtual ring.

(1601) The Virtual Ring Manager checks if a "Virtual Ring Insertion Request" message has been received.

(1602) If a "Virtual Ring Insertion Request" message has been received, the Virtual Ring Manager sends a "Virtual Ring Change Neighbour" message to its own downstream neighbour, and starts a Change Neighbour Timer.

(1603) the Virtual Ring Manager waits for a "Virtual Ring Neighbour Changed" message. If no "Virtual Ring Neighbour Changed" message is received and the Change timer expires, then the procedure fails.

(1604) the Virtual Ring Manager updates its downstream address with the address of the new Node.

(1605) The Virtual Ring Manager sends an "Virtual Ring Insertion Confirmation" message to the Node to insert.

(1606) The Virtual Ring Manager checks if a "Virtual Ring Removal Request" message has been received.

(1607) The Virtual Ring Manager sends a "Virtual Ring Change Neighbour" message to the downstream neighbour of the Node to remove.

(1608) The Virtual Ring Manager sends a "Virtual Ring Change Neighbour" message to the upstream neighbour of the Node to remove.

(1609) The Virtual Ring Manager starts the Change Neighbour Timer.

(1610) When the "Virtual Ring Neighbour Changed" messages have been received from the upstream and the downstream neighbour nodes, the Virtual Ring Manager sends a "Virtual Ring Removal Confirmation" message to the Node to remove.

(1611) The Virtual Ring Manager checks if a "Virtual Ring Neighbour Loss Indication" message has been received.

If a "Virtual Ring Neighbour Loss Indication" message has been received:

(1611) The Virtual Ring Manager checks if a "Virtual Ring Neighbour Loss Indication" message has been received.

(1608) The Virtual Ring Manager sends a "Virtual Ring Change Neighbour" message to the upstream neighbour of the Node to remove.

(1609) The Virtual Ring Manager starts the Change Neighbour Timer.

If a "Virtual Ring Neighbour Loss Indication" message has not been received:

(1601) The Virtual Ring Manager checks if a "Virtual Ring Insertion Request" message has been received.

Flow of Node Insertion

FIG. 17 illustrates the Node Insertion process.

(1701) Node G is the Node to insert. Its ring table contains the Virtual Ring and Backup Ring Manager addresses.

(1702) Node E is the Virtual Ring Manager.

(1703) Node F is the downstream neighbour node of the Virtual Ring Manager.

(1704) Inserting Node G sends a "Virtual Ring Insertion Request" message to the Virtual Ring Manager.

(1705) The Virtual Ring Manager sends a "Virtual Ring Change Neighbour" message to its downstream neighbour node (node F) in order to insert the new Node G just before Node F.

(1706) Node F updates its Virtual Ring table.

(1707) Node F replies with a "Virtual Ring Neighbour Changed" message to the Virtual Ring Manager.

(1708) The Virtual Ring Manager updates its Ring Table to insert the new Node G just after itself.
(1709) The Virtual Ring Manager sends a "Virtual Ring Insertion Confirmation" message to the new inserting Node G.
(1710) Node G updates its Virtual Ring table with the addresses of 2 adjacent nodes.

Flow of Solicited Node Removal

FIG. 18 illustrates the Solicited Node Removal process.
(1801) Node B is the upstream neighbour node of Node C, the Node to remove.
(1802) Node C is the Node to remove.
(1803) Node D is the downstream neighbour node of Node C.
(1804) Node E is the Virtual Ring Manager.
(1805) Removing Node C sends a "Virtual Ring Removal Request" message to the Virtual Ring Manager.
(1806) The Virtual Ring Manager sends a "Virtual Ring Change Neighbour" message to Node D (downstream neighbour node).
(1807) The Virtual Ring Manager sends a "Virtual Ring Change Neighbour" to Node B (upstream neighbour node) and starts the Change Neighbour Timer.
(1808) Node B updates its Ring Table.
(1809) Node B sends a "Virtual Ring Neighbour Changed" message to the Virtual Ring Manager.
(1810) Node D updates its Ring Table.
(1811) Node D sends a "Virtual Ring Neighbour Changed" message to the Virtual Ring Manager.
(1812) Virtual Ring Manager stops the Change Neighbour Timer and sends a "Virtual Ring Removal Confirmation" message to the Node C to remove.

Flow of Unsolicited Node Removal (Node Loss)

FIG. 19 illustrates the unsolicited Node Removal process.
(1901) Node B is the upstream neighbour node of Node C, the Node to remove.
(1902) Node C is the Node to remove.
(1903) Node D is the downstream neighbour node of Node C.
(1904) Node E is the Virtual Ring Manager.
(1905) The upstream neighbour node B detects the loss of the TCP connection with node C and sends a "Virtual Ring Loss Indication" message to the Virtual Ring Manager.
(1906) The downstream neighbour node D detects the loss of the TCP connection with node C and sends a "Virtual Ring Loss Indication" message to the Virtual Ring Manager.
(1907) The Virtual Ring Manager sends a "Virtual Ring Change Neighbour" message to Node D (downstream neighbour node).
(1908) The Virtual Ring Manager sends a "Virtual Ring Change Neighbour" message to Node B (upstream neighbour node) and starts the Change Neighbour Timer.
(1909) Node B updates its Ring Table.
(1910) Node B sends a "Virtual Ring Neighbour Changed" message to the Virtual Ring Manager.
(1911) Node D updates its Ring Table.
(1912) Node D sends a "Virtual Ring Neighbour Changed" message to the Virtual Ring Manager.

In one embodiment, the invention is implemented in software and can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. In one embodiment, the computer program is executed on a node in the network.

ADVANTAGES OF THE PRESENT INVENTION

1) Reduction of the Number of TCP Sessions in the Network

With the present invention, only N TCP sessions are required to interconnect N nodes versus $N\times(N-1)/2$ sessions in a full meshed network or $2\times N-3$ sessions in a dual star configuration. A session is a virtual connection between two nodes, enabling the exchange of data between these nodes and taking care of transmission problems like flow control and retransmission. A TCP session is an example of session between two nodes supporting the TCP/IP protocol. The current invention is implemented on top of the TCP (Transmission Control Protocol) layer of the TCP/IP protocol stack, and can be used by any node supported by the TCP/IP protocol, which is the protocol the most widely used in the world. As illustrated in FIG. 1, in a full meshed network of N nodes, each node has to establish a TCP session with each of the N−1 other nodes. This means the establishment of $N\times(N-1)/2$ TCP sessions.

According to the present invention, each node has to establish a TCP session with only 2 other nodes: the upstream neighbour node and the downstream neighbour node. This means a total of N sessions in a virtual ring of N nodes. The saving resulting from the present invention can be calculated as follows:

$N\times(N-1)/2$ sessions in a full meshed network versus $N$ sessions in the virtual ring configuration. The difference is equal to $N\times(N-1)/2-N=N^2/2-N/2-N=N^2/2-3N/2=N\times(N-3)/2$.

Therefore, the current invention allows to save $N\times(N-3)/2$ sessions in the network.

Reducing the number of sessions between the nodes brings several other advantages as it will be explained in the following points.

2) Reduction of the Bandwidth Utilization in the Network

The present invention avoids multiple and unnecessary copies because each node receives one and only one copy of a same message. In a full meshed topology as described in FIG. 1, each node communicates with all the other nodes. If each node needs to send the same piece of information to the other nodes, each node will forward this piece of information to all its neighbour nodes, and this will duplicate the number of messages exchanged in the network. This is typically the case when the nodes are routers exchanging routing information using a routing protocol like RIP (Routing Information Protocol). Periodically, each router communicates, or floods, its routing table to the other routers in the network. Another example is when a distributed database needs to be synchronised, and when the servers participating in the distributed database need to exchange a same record. Usually, the broadcast of information is managed by the application layer, which must take care of the way the information is distributed between the nodes.

The present invention enables the exchange of a same piece of information between all the nodes so that each node receives one and only one copy of the information. Because nodes are virtually connected to a virtual ring, and because the information circulates along that ring and is seen by each node connected to the ring, the network is not flooded by multiple copies of messages exchanged between nodes.

3) Reduction of the CPU Utilization in Each Node

Establishing and Maintaining a TCP session requires computer resources to manage the flow control, the retransmission, and to generate acknowledgements and keepalives. The present invention reduces the number of TCP sessions required for nodes to communicate, and therefore reduces the utilization of data processing resources in nodes.

4) Reduction of the Memory Consumption Inside Each Node

In each node, the maintenance of TCP sessions requires to keep the context of these session, with information such as the sequence number of the last segment sent, or the sequence number of the next acknowledgement to send. The storage of this information consumes memory. Reducing the number of TCP sessions has resulted in reducing the memory consumption in the nodes.

While the invention has been particularly shown and described with reference to a preferred embodiment, it will be understood that various changes in form and detail may be made therein without departing from the spirit, and scope of the invention.

What is claimed is:

1. A method to use in a node within a network comprising a transport layer protocol providing end to end data transfer, for multicasting datagrams on a virtual ring, each node on the virtual ring being logically connected according to the network transport layer protocol to an upstream neighbor node and a downstream neighbor node through virtual connections, comprising:
   sending a datagram to the downstream neighbor node on the virtual ring, said datagram including a virtual ring identifier, a source address of a sending node, a destination address of a next node on the ring, a source port, a destination port, and an identifier for a node originator of the datagram;
   each node including said ring identifier;
   identifying the received datagram upon receipt of the datagram;
   determining if the received datagram is a token generated by a virtual ring manager, wherein the token comprises a sequence number incremented each time the token is received by the virtual ring manager node, and forwarding the token to the downstream neighbor node on the identified virtual ring if the token is valid, wherein said manager is responsible for validating and modifying a ring topology;
   determining if the received datagram is a virtual ring datagram containing data other than a token;
   forwarding said virtual ring datagram to the downstream neighbor node on the identified virtual ring if the received virtual ring datagram has not been locally originated; and
   removing the virtual ring datagram from the virtual ring if the received virtual ring datagram has been locally originated.

2. The method of claim 1, wherein the step of determining if the received datagram is a token includes identifying the virtual ring and checking that the token has been sent by the upstream neighbor node on the identified virtual ring; and the step of determining if the received datagram is a virtual ring datagram includes identifying the virtual ring when a virtual datagram is received and checking that the virtual ring datagram has been sent by the upstream neighbor node on the identified virtual ring.

3. The method according to claim 1, wherein a node on the virtual ring is defined as being a virtual ring manager node; the token comprises a sequence number incremented each time the token is received by the virtual ring manager node; and the step of checking whether the token is valid comprises checking whether the token sequence number has been incremented since a last reception.

4. The method of claim 3, wherein the step of checking whether the token is valid comprises executing a recovery procedure if it is determined said token is not valid.

5. The method of claim 3, further comprising:
   maintaining and updating:
      means for identifying the virtual ring;
      an address of the upstream neighbor node;
      an address of the downstream neighbor node; and
      an address of the virtual ring manager; and
   optionally maintaining and updating an address of a backup virtual ring manager.

6. The method of claim 1, wherein the step of forwarding the token to the downstream neighbor node on the identified virtual ring comprises:
   starting a timer and waiting for a return of the token; and
   executing a recovery procedure when the timer expires, wherein receipt of a token comprises stopping the timer.

7. The method of claim 1, wherein a node is selected from a group consisting of:
   a computer system routing datagrams in the network, and a computer system exchanging datagrams on the network.

8. The method of claim 1, further comprising a virtual ring manager node on the virtual ring to execute preliminary steps comprising:
   generating a token;
   setting a token sequence number of said token to an initial value;
   forwarding said token to the downstream neighbor node on the virtual ring, comprising:
   incrementing the token sequence number; and executing a recovery procedure when a timer expires comprising:
      generating a new token; and
      forwarding said token to the downstream neighbor node on the virtual ring.

9. The method of claim 1, further comprising a preliminary step of joining the virtual ring, comprising:
   sending to a virtual ring node manager node previously defined on the virtual ring, an insertion request message comprising an address of the node; and means for identifying the virtual ring; and
   receiving an insertion confirmation message from the virtual ring manager node comprising an address of an upstream neighbor node; and an address of a downstream neighbor node.

10. The method of claim 9, wherein the step of sending an insertion request message comprises: starting an insertion timer; wherein the step of receiving an insertion confirmation message comprises stopping the insertion timer; and wherein, if the insertion timer expires, said method comprises:
   sending an insertion request message comprising:
      the address of the node; and
      means for identifying the virtual ring to a backup ring manager node previously defined on the virtual ring;
   restarting the insertion timer;

receiving an insertion confirmation message from the backup virtual ring manager comprising:
the address of an upstream neighbor node;
the address of a downstream neighbor node; and
stopping the insertion timer.

11. The method of claim 1, further comprising leaving the virtual ring comprising:
sending to a virtual ring manager node previously defined on the virtual ring, a removal request message comprising:
an address of the upstream neighbor node;
an address of the downstream neighbor node; and
an address of the node; and
receiving a removal confirmation message from the virtual ring manager.

12. The method of claim 11, wherein the step of sending a removal request message comprises starting a removal timer; wherein the step of receiving a removal confirmation message comprises stopping the removal timer; and wherein, if the insertion timer expires, said method comprises:
sending to a backup ring manager node previously defined on the virtual ring, a removal request message, comprising:
the address of the upstream neighbor node;
the address of the downstream neighbor node; and
the address of the node;
restarting the removal timer;
receiving a removal confirmation message from the backup virtual ring manager; and
stopping the removal timer.

13. The method according to claim 1, further comprising:
receiving from a virtual ring manager node defined on the virtual ring, a change neighbor message comprising an address selected from a group consisting of: an address of a new upstream neighbor node, an address of a new downstream neighbor node, and combinations thereof;
maintaining an address selected from a group consisting of: the address of the new upstream neighbor node, the address of the new downstream neighbor node, and combinations thereof; and
sending to the virtual ring manager node a neighbor change confirmation message.

14. A computer network comprising:
at least two nodes having a transport layer protocol to provide end to end data transfer to multicast datagrams in a virtual ring, each datagram including a virtual ring identifier, a source address of a sending node, a destination address of a next node on the ring, a source port, a destination port, and an identifier for a node originator of the datagram;
each node on said virtual ring being logically connected to an upstream neighbor node and a downstream neighbor node through virtual connection; and
instructions for multicasting datagrams on said virtual ring comprising:
sending a datagram to the downstream neighbor node on the virtual ring;
identifying the received datagram upon receipt of the datagram;
determining if the received datagram is a token generated by a virtual ring manager, wherein the token comprises a sequence number incremented each time the token is received by the virtual ring manager node, responsible for validating and modifying a virtual ring topology and forwarding the token to the downstream neighbor node on the identified virtual ring if the token is valid;

determining if the received datagram is a virtual ring datagram containing data other than a token;
forwarding said virtual ring datagram to the downstream neighbor node on the identified virtual ring if the received virtual ring datagram has not been locally originated; and
removing the virtual ring datagram from the virtual ring if the received virtual ring datagram has been locally originated.

15. An article comprising:
a computer network comprising at least two nodes having a transport layer protocol to provide end to end data transfer to multicast datagrams in a virtual ring; each node on said virtual ring being logically connected to an upstream neighbor node and a downstream neighbor node through virtual connection;
a non-transitory computer readable medium in said network;
instructions in said medium for multicasting datagrams on said virtual ring comprising:
instructions for sending a datagram to the downstream neighbor node on the virtual ring;
instructions for identifying the received datagram upon receipt of the datagram;
instructions for determining if the received datagram is a token generated by a virtual ring manager responsible for validating and modifying a virtual ring topology, and forwarding the token to the downstream neighbor node on the identified virtual ring if the token is valid, said token being a datagram including a token identifier and a token sequence number, a source address of a sending node, a source port, a destination port, and a destination address of a next node on the ring, and means for identifying the virtual ring, wherein the sequence number is incremented each time the token is received by the virtual ring manager node;
instructions for determining if the received datagram is a virtual ring datagram containing data other than a token;
instructions for forwarding said virtual ring datagram to the downstream neighbor node on the identified virtual ring if the received virtual ring diagram has not been local originated; and
instructions for removing the virtual ring datagram from the virtual ring if the received virtual ring datagram has been locally originated.

16. A method to use in a node within a network comprising a transport layer protocol providing end to end data transfer, for multicasting datagrams on a virtual ring, each node on the virtual ring being logically connected according to the network transport layer protocol to an upstream neighbor node and a downstream neighbor node through virtual connections, comprising;
sending a datagram to the downstream neighbor node on the virtual ring; said datagram comprising:
a virtual ring identifier;
means for identifying the node originator of the datagram;
a destination address of a next node on the ring; and
data;
identifying the received datagram upon receipt of the datagram;
determining if the received datagram is a token generated by a virtual ring manager responsible for validating and modifying a ring topology, comprising:
identifying the virtual ring; checking whether the token is valid; and forwarding the token to the downstream neighbor node on the identified virtual ring if the token is valid, said token being a datagram including a token identifier and a token sequence number;

determining if the received datagram is a virtual ring datagram containing data other than a token, comprising:

identifying the virtual ring;

checking the node originator of the received virtual ring datagram;

determining if the received virtual ring datagram has not been locally originated, comprising:

processing data comprised in said virtual ring datagram and forwarding said virtual ring datagram to the downstream neighbor node on the identified virtual ring; and determining if the received virtual ring datagram has been locally originated, comprising:

removing the virtual ring datagram from the virtual ring.

* * * * *